United States Patent [19]

Gerace

[11] Patent Number: 4,520,765
[45] Date of Patent: Jun. 4, 1985

[54] INTERNAL COMBUSTION ENGINE AND OPERATING CYCLE THEREFOR

[76] Inventor: Anthony Gerace, 28 Allegheny Ave., #2601, Towson, Md. 21204

[21] Appl. No.: 489,549

[22] Filed: Apr. 28, 1983

[51] Int. Cl.³ .............................................. F02G 1/044
[52] U.S. Cl. .............................. 123/27 R; 123/51 BC; 123/51 BD; 123/53 R; 123/68; 123/554
[58] Field of Search ....................... 123/39, 26, 64, 68, 123/59 EC, 59 BM, 69 R, 317, 554, 27 GE, 531, 532, 533, 534, 535, 51 BC, 51 BD, 53 R, 53 A, 53 B, 53 AA, 53 BA, 27 R

[56] References Cited

U.S. PATENT DOCUMENTS

| Re. 30,565 | 4/1981 | Kristiansen | 123/43 AA |
|---|---|---|---|
| 1,486,299 | 3/1924 | Powell | 123/68 |
| 4,040,400 | 8/1977 | Kiener | 123/68 |
| 4,233,815 | 11/1980 | Melchior | 60/606 |
| 4,359,017 | 11/1982 | May | 123/53 BA |

FOREIGN PATENT DOCUMENTS 2628155 1/1978 Fed. Rep. of Germany .
2840898 4/1980 Fed. Rep. of Germany .

Primary Examiner—Craig R. Feinberg
Assistant Examiner—David A. Okonsky
Attorney, Agent, or Firm—Ziems, Walter & Shannon

[57] ABSTRACT

An engine and method in accordance with this invention includes a plurality of parallel cylinders equally spaced from a longitudinally extending engine axis with a pair of opposed pistons in each cylinder for controlled reciprocation therein. Respective rotatably mounted axial-faced cams and followers control the motion of the pistons through the operating cycle to permit at least one power stroke from each cylinder during each rotation of the engine. A controllable divider valve located between the opposed faces of the pistons defines, on one side, a first air/fuel receiving compression chamber and, on the other side, a second relatively high-pressure ignition air receiving chamber. Before the cam-controlled compression stroke, the divider valve is closed so that the air/fuel mixture on the one side of the closed valve is compressed to a first pressure and the ignition air on the other side of the valve is compressed to a relatively higher pressure causing the temperature of this more highly compressed air to increase to a temperature above the ignition temperature of the compressed air/fuel mixture. Ignition begins by opening the divider valve to permit the high-pressure, high-temperature ignition air in the second chamber to enter the compressed air/fuel mixture in the first chamber, causing burning thereof. The burning air/fuel mixture then enters the second chamber on the other side of the still-open valve to heat a relatively large mass of air causing both pistons to retract during the power stroke.

20 Claims, 14 Drawing Figures

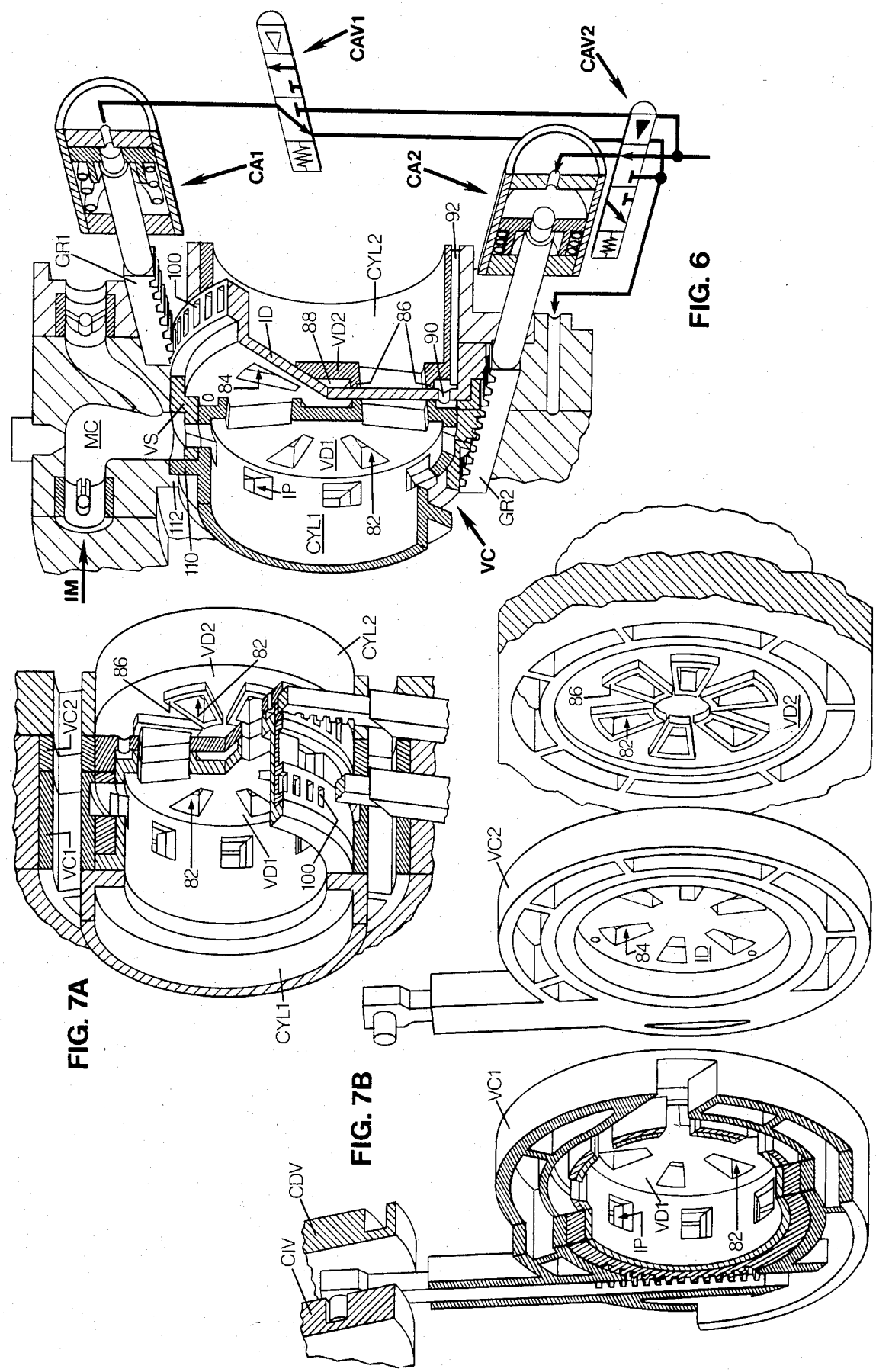

| | CYLINDER 15 psia | STROKE INCHES | COMPRESSION RATIO | CLEARANCE SPACE | TOTAL STROKE | CLEARANCE SPACE' | EXPANSION RATIO | CYLINDER PRESSURE | PRESSURE FACTOR | FINAL PRESSURE | % GAINED |
|---|---|---|---|---|---|---|---|---|---|---|---|
| I | A/F<br>Air | 3<br>3 | 8:1<br>24:1 | .375<br>.125 | 6.0 | .500 | 12.00:1 | 120<br>360 | 90<br>90 | 180 | [ 50.0] |
| | A/F<br>Air | 2<br>3 | 8:1<br>24:1 | .250<br>.125 | 5.0 | .375 | 13.33:1 | 120<br>360 | 80<br>120 | 200 | ( 11.1)<br>[ 66.7] |
| | A/F<br>Air | 1<br>3 | 8:1<br>24:1 | .125<br>.125 | 4.0 | .250 | 16.00:1 | 120<br>360 | 60<br>180 | 240 | ( 33.3)<br>[100.0] |
| II | A/F<br>Air | 3<br>3 | 10:1<br>24:1 | .300<br>.125 | 6.0 | .425 | 14.12:1 | 150<br>360 | 106<br>106 | 212 | [ 76.7] |
| | A/F<br>Air | 2<br>3 | 10:1<br>24:1 | .200<br>.125 | 5.0 | .325 | 15.38:1 | 150<br>360 | 92<br>139 | 231 | ( 8.9)<br>[ 92.5] |
| | A/F<br>Air | 1<br>3 | 10:1<br>24:1 | .100<br>.125 | 4.0 | .225 | 17.78:1 | 150<br>360 | 67<br>200 | 267 | ( 25.9)<br>[122.5] |
| III | A/F<br>Air | 3<br>3 | 12:1<br>24:1 | .250<br>.125 | 6.0 | .375 | 16.00:1 | 180<br>360 | 120<br>120 | 240 | [100.0] |
| | A/F<br>Air | 2<br>3 | 12:1<br>24:1 | .166<br>.125 | 5.0 | .291 | 17.18:1 | 180<br>360 | 103<br>154 | 257 | ( 7.1)<br>[114.1] |
| | A/F<br>Air | 1<br>3 | 12:1<br>24:1 | .083<br>.125 | 4.0 | .208 | 19.23:1 | 180<br>360 | 72<br>216 | 288 | ( 20.0)<br>[140.0] |
| IV | A/F<br>Air | 3<br>3 | 12:1<br>20:1 | .250<br>.150 | 6.0 | .400 | 15.00:1 | 180<br>300 | 113<br>112 | 225 | [ 87.5] |
| | A/F<br>Air | 2<br>3 | 12:1<br>20:1 | .166<br>.150 | 5.0 | .316 | 15.82:1 | 180<br>300 | 95<br>142 | 237 | ( 5.3)<br>[ 97.5] |
| | A/F<br>Air | 1<br>3 | 12:1<br>20:1 | .083<br>.150 | 4.0 | .233 | 17.17:1 | 180<br>300 | 64<br>193 | 257 | ( 14.2)<br>[114.2] |
| | | 3<br>3 | 8:1<br>24:1 | + .375 = .500<br>+ .125 = .125 | | .375 DIVIDED BY .500 = 75%<br>.125 DIVIDED BY .500 = 25% | | .75 X 120 = 90 = 180<br>.25 X 360 = 90 | | | |

( ) Percent of pressure increase over 3 inch air-fuel stroke/3 inch air only stroke arrangement

[ ] Percent of pressure increase over 8:1 compression ratio Otto cycle at 15 psia

FIG. 9

INTERNAL COMBUSTION ENGINE AND OPERATING CYCLE THEREFOR

BACKGROUND OF THE INVENTION

1. Field of the Invention

The present invention relates to internal combustion engines and, more particularly, to internal combustion engines of compact design having high thermal efficiency, very high power-to-weight ratio, high fuel economy, low pollutant emissions, constant horsepower capability, variable compression ratios and variable compression braking.

2. Prior Art

The predominant internal combustion engine configuration presently used is the crankshaft/cylinder arrangement with a working piston reciprocates within a cylinder to drive a rotatable crankshaft. Variations of this configuration have included the in-line, V, radial, and horizontally opposed cylinder alignments. Regardless of the configuration, the piston reciprocates within its cylinder in accordance with one of two predominant operating cycles, namely, the two- or four-stroke spark-ignition Otto cycle or the two- or four-stroke compression-ignition Diesel cycle. With the spark-ignition cycle, a homogeneous mixture of air and fuel at a preferred air/fuel ratio is compressed with ignition caused by an electrical spark or the equivalent. In the compression-ignition cycle, fuel is injected into air that has been compressed to cause an adiabatic increase in its temperature to a temperature above the auto- or self-ignition temperature of the fuel.

Both types of operating cycles and the various physical engine configurations that have been developed have proved satisfactory although each has attendant drawbacks.

In the spark-ignition engine, the fuel must be premixed with air to provide a desirably homogeneous mixture with the ratio of the air to the fuel controlled so as to fall within a preferred ratio range, e.g., between 11:1 and 17:1. Air/fuel ratios greater than 17:1 result in mixtures which may or may not combust and air/fuel ratios below 11:1 result in mixtures which are inefficient from the standpoint of fuel consumption and unacceptable with regard to pollution. Additionally, the compression ratio of the spark-ignition engine is limited to some maximum so as not to cause unintentional pre-ignition of the homogeneous air/fuel mixture during the compression stroke. The compression ratio limit also disadvantageously limits the thermal efficiency of spark-ignition engines.

In contrast to the spark-ignition engine, the compression-ignition engine utilizes air that has been heated during the compression stroke to a temperature greater than the auto-ignition temperature of the fuel so that fuel can be injected in a heterogeneous manner into the so-heated air to cause burning. Thus, the fuel injected in a compression-ignition engine can be burned in considerable excess air to provide a rather large mass of heated air for the expansion stroke, but does not use all the available air in the cylinder for combustion. Accordingly, the compression-ignition engine provides a substantial increase in thermal efficiency compared to the spark-ignition engine. Unfortunately, compression-ignition engines require a rather sophisticated and expensive fuel delivery and injection system that mitigates against the increase in thermal efficiency.

In the traditional crankshaft/cylinder arrangement, regardless of the particular operating cycle implemented, the piston is usually at or near its uppermost position (TDC) during that portion of the cycle in which the fuel is ignited. In this configuration, the crankshaft throw position presents a moment arm against which the piston acts that is the smallest of the operating cycle, and, accordingly, the mechanical conversion efficiency of the combustion products expanding against the piston during that portion of the cycle is poor.

Additionally, the mechanical constraints of the traditional crankshaft/connecting rod arrangement is such that it is very difficult to vary the compression ratio of the engine, since the crankshaft throw distance and the connecting rod length are fixed and not easily changed. Because of this, the traditional crankshaft/connecting rod arrangement is not amenable to variable compression schemes. As can be appreciated, a variable compression engine would permit the use of various types and grades of fuels and is particularly suitable in situations where the cost of various alternative engine fuels varies or where fuel supplies may be uncertain, such as in a military environment. In addition to the mechanical constraints of the crankshaft/connecting rod arrangement, the traditional cam operated valve train necessitates a fixed valve timing that is optimum for only a portion of the engine power curve. As can be appreciated, variable valve timing would permit optimization over the entire engine operating range.

SUMMARY OF THE INVENTION

In view of the above, it is the primary object of the present invention, among others, to provide an entirely new and very much improved cycle for internal combustion engines in which air and various types and grades of fuel in a homogeneous mixture is ignited by compression ignition techniques at compression ratios much higher than those previously attained.

It is also an object of the present invention to provide a new type of internal combustion engine in which cam-operated pistons produce high mechanical efficiency and provide one, two, or more power strokes per revolution, which results in a very compact design and a high power-to-weight ratio.

It is also an object of the present invention to provide an engine having a new and very much improved operating cycle that provides a heretofore unattainable thermal efficiency in which the air/fuel mixture's physical and chemical delay periods are reduced, in which combustion occurs under constant volume and/or constant pressure conditions, and in which very high compression and expansion ratios are utilized.

It is also an object of the present invention to provide a design which allows, contrary to prior designs, for the shortening of a piston stroke in such a way to cause a considerable increase in efficiency and thereby provide for substantial fuel economy.

It is also an object of the present invention to provide an engine in which an additional increase in thermal and mechanical efficiency can be obtained by recovering the pressure and heat energy in the exhaust gas flow and the heat energy in the cooling system by compounding to provide a considerable increase in the engine power output.

It is also an object of the present invention to provide an engine having means for varying the compression ratios during engine operation and combine them with new operating cycles, an engine having a true multifuel capability, and an engine with a low pollutant exhaust.

It is also an object of the present invention to provide an engine by which valve timing can be varied during engine operation, to provide increased engine control and variable compression braking.

It is also an object of the present invention to provide an engine that will eliminate expensive fuel delivery systems by mixing air and fuel in the manifold and, when combined with the new and unique engine cycles, will provide an engine that will operate equally well with a very rich air/fuel ratio (9:1) for maximum power or a very lean air/fuel ratio (150:1) to provide a large quantity of heated air for expansion. The result is an engine with a constant horsepower capability that will eliminate or reduce transmission requirements in many applications. The addition of compounded turbocharging provides additional engine output power.

In accordance with these objects, and others, the present invention provides for an internal combustion engine having at least one cylinder with first and second pistons located in the cylinder for controlled reciprocating motion by which the pistons advance toward each other to respective top dead center (TDC) positions and retract away from one another to respective bottom dead center (BDC) positions. A divider valve is located in the cylinder between the pistons to divide the portion of the cylinder between the piston faces into a first compression chamber defined between the first piston and the divider valve and a second compression chamber defined between the second piston and the divider valve. The motion of the pistons and the opening and the closing of the divider valve is controlled so that inlet air passes through the first chamber, through the open divider valve and into the second compression chamber and remains therein when the divider valve is closed and a mixture of air and fuel enters the first compression chamber. During the compression stroke the divider valve remains closed and the motion of the pistons is controlled so that the first piston compresses its air/fuel mixture in the first compression chamber defined between the first piston and the closed divider valve to a selected pressure and the second piston compresses the air in the second compression chamber defined between the second piston and the closed divider valve to a pressure sufficient to cause an adiabatic increase in temperature thereof to a temperature greater than the self-ignition temperature of the compressed air/fuel mixture in the adjacent, first compression chamber. When the compression stroke of each piston is completed, the divider valve is opened to permit the high temperature compressed air in the second chamber to pass through the opened divider valve into the first compression chamber containing the air/fuel mixture to cause ignition thereof. The subsequently formed combustion products from the so-ignited air/fuel mixture in the first chamber then pass through the opened divider valve into the second chamber to further heat the air in the second chamber. The heated and expanded gases in both chambers cause the pistons to forcibly retract during the power stroke toward their respective bottom dead center (BDC) positions to provide an effective 'hyper' expansion of the combustion products as explained below.

In one preferred embodiment of the present invention, a plurality of working cylinders are aligned parallel to and equi-spaced from a longitudinally extending engine axis with each cylinder containing a pair of working pistons and a divider valve to divide the respective cylinder into first and second compression chambers. Respective rotatibly mounted axial-faced cams are located on opposite ends of the cylinders with a cam follower/connecting mechanism coupling the pistons to their respective motion controlling axial-faced cams. The selected cam profiles cause the pistons to move through a compression stroke followed by ignition and a subsequent power stroke with an intermediate exhaust/scavenge/inlet phase at the end of each power stroke, just prior to the following compression stroke. The exhaust gases produced during the combustion process can be provided to one or more turbine units for the purpose of extracting usable power from the exhaust gases. The turbine shaft can be connected to or otherwise drives the compressor units that pressurize the inlet air and/or supply compressed air for pneumatic control valves. Additionally, the turbine shaft can be connected to the engine output shaft to provide engine compounding or a compounded turbocharger configuration so that useable power extracted from the exhaust gas flow above that needed to drive the inlet air compressor units augments the engine power output. Fuel is preferably provided through electronically or mechanically controlled fuel injectors, although conventional carburetors of the shut-off type are suitable.

In one form of the invention, the axial-face cam controlling those pistons that compresses the air/fuel mixture is selectively displaceable along the longitudinal axis of the engine to permit the compression ratio of the air/fuel mixture to be varied to optimize combustion parameters for a particular grade or type of fuel. Additionally, the axial-face cam profile is contoured to advantageously allow for efficiency-enhancing constant volume and/or constant pressure combustion during the initial portion of the power stroke.

The divider valve that divides each cylinder into the air/fuel compression chamber and the ignition air compression chamber can take several forms. The valve, in one form, can include first and second mating valve disks, each having a plurality of sector-shaped through openings with one of the disks mounted for oscillating movement so that the openings of both disks are alternately in registration with one another to permit communication from one side of the valve to the other and out of registration with one another to effectively close the valve. In another form, an oscillating intermediate valve disk having plural sector-shaped openings can be positioned between two stationary valving disks having like sector-shaped openings with opening and closing of the valve controlled by movement of the oscillatable intermediate valving disk. In another form, the divider valve can be configured as a sliding block valve.

Because of the temperatures and pressures involved, the divider valve can be fabricated from those materials conventionally utilized for exhaust valve type applications. In addition, ceramics are well suited for fabricating the divider valve. If preferred, any leakage that occurs between the mating surface-to-surface interface of the valving surfaces can be directed through bypass passageways to the engine exhaust to thereby prevent leakage between chambers and potential pre-ignition.

The moveable portion of the divider valve can be controlled in various manners including mechanically through cams and cam followers, pneumatically utilizing pneumatic actuators, electrically, using electromagnetic solinoids, or hydraulically using hydraulic actuators and by other control means.

The present invention advantageously provides a new cycle for the compression-ignition of a homogeneous, rather than heterogeneous, mixture of air and fuel to thereby dispense with the expensive high pressure fuel injection arrangements previously utilized on compression-ignition engines and direct-injected spark-ignition engines. In addition, the engine provides for the rapid heating of a relatively large mass of air and for a comparatively large expansion ratio that affords an opportunity to extract the maximum working energy from the gaseous combustion products and thereby optimize overall thermal efficiency. The use of engine compounding or a compounded turbocharger arrangement permits additional extraction of energy from the exhaust gas flow for both the purpose of pressurizing the inlet air and providing additional energy to the engine output shaft.

BRIEF DESCRIPTION OF THE FIGURES

The description of the figures, as well as the objects, features, and advantages of the present invention will be more fully appreciated by reference to the following detailed description of a presently preferred, but none the less illustrative, embodiment in accordance with the accompanying drawing wherein:

FIG. 6 is a detailed view of the inlet and divider valve and their actuators of the engine illustrated in FIG. 4;

FIG. 7A is an isometric, detailed view of the upper valve cartridge assembly of the FIG. 5 engine;

FIG. 7B is an exploded isometric, detailed view of the lower valve cartridge assembly of the engine shown in FIG. 5;

FIG. 9 is a comparative table illustrating performance attributes of various engine configurations.

DESCRIPTION OF THE PREFERRED EMBODIMENT

Figure 1:
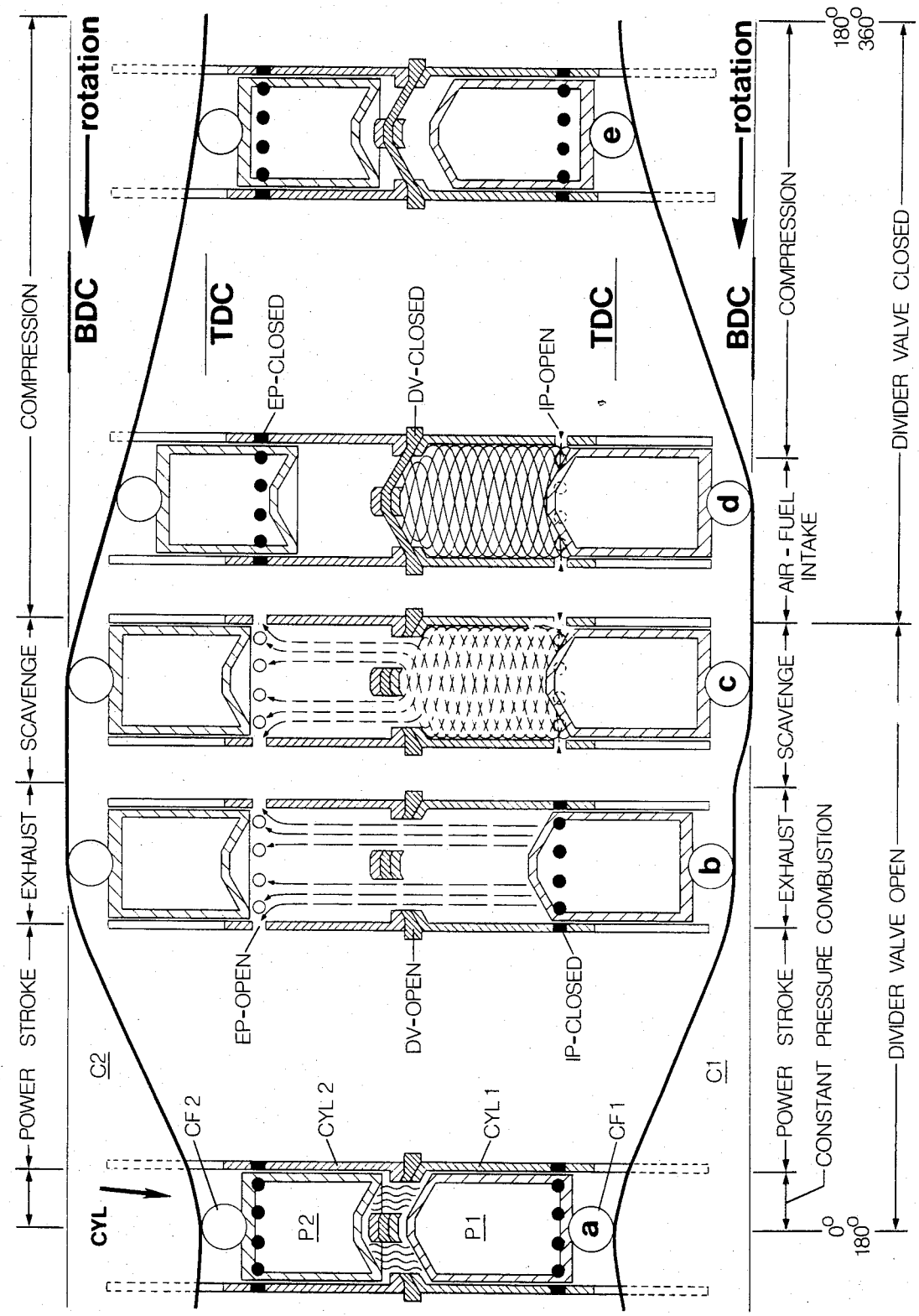
FIG. 1 is a schematic flat development of a two-stroke by two-stroke (2/2 stroke) operating cycle in accordance with the present invention.
Figure 2:
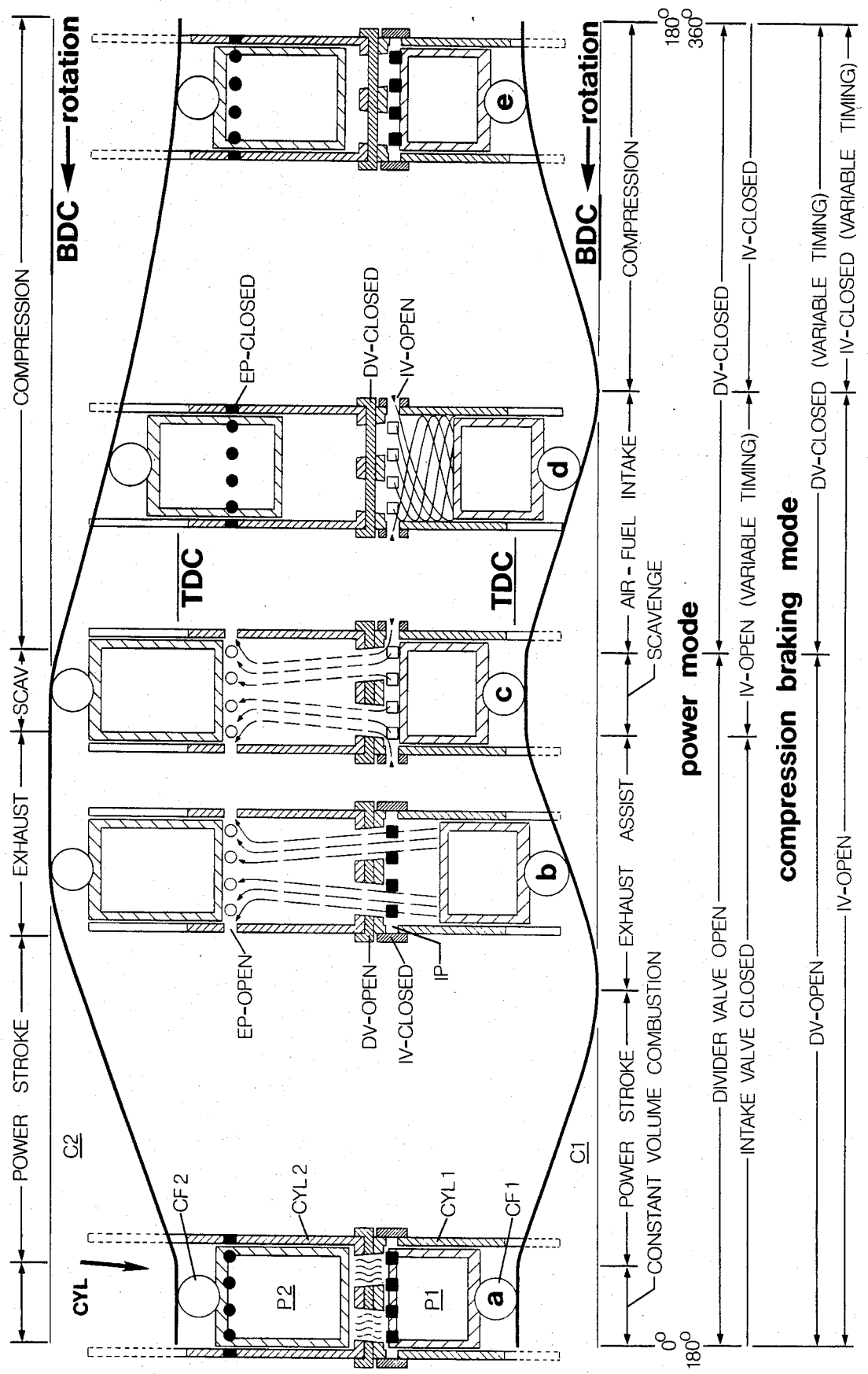
FIG. 2 is a schematic flat development of a four-stroke by two-stroke (4/2 stroke) operating cycle that includes a variable compression braking feature in accordance with the present invention.
Figure 3:
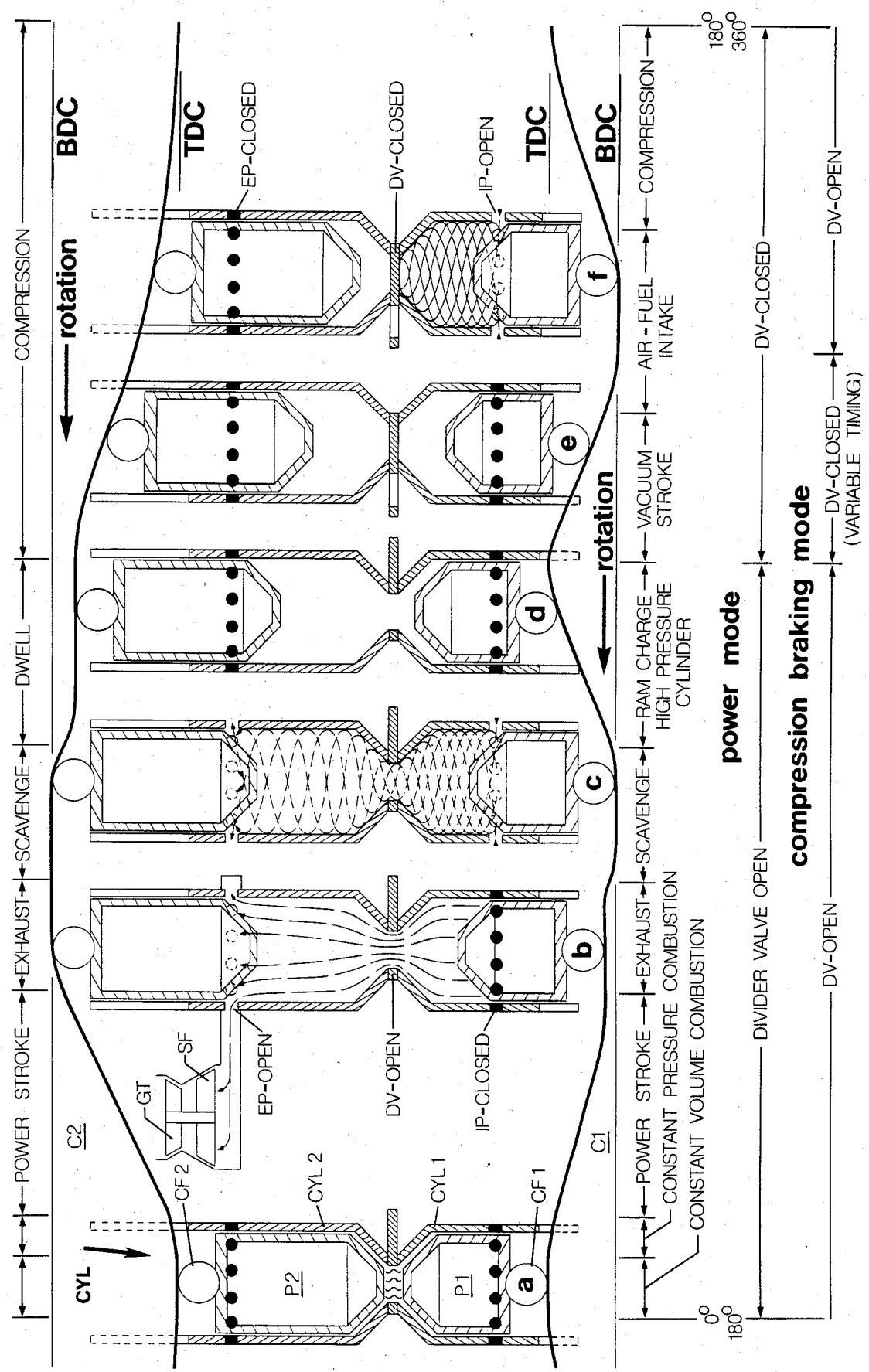
FIG. 3 is a schematic flat development of a four-stroke cycle which includes a vacuum stroke by two-stroke (4 V/2 stroke) operating cycle that includes a variable compression braking feature in accordance with the present invention.

FIGS. 1, 2, and 3 illustrate example operating cycles for the various engine embodiments described generally below in relation to FIGS. 4 and 5. The operating cycles shown in FIGS. 1, 2 and 3 are merely exemplary of a wider group of possible operating cycles and variations thereof. FIG. 1 illustrates a 180° two-stroke by two-stroke (2/2 stroke) operating cycle in which two complete operating cycles occur within one 360-degree revolution of the engine and which includes an efficiency-enhancing constant-pressure combustion feature. FIG. 2 illustrates a four-stroke by two-stroke (4/2 stroke) operating cycle in which two full operating cycles are also completed within one 360-degree revolution of the engine and which includes a desirable constant-volume combustion feature and which can be modified to include variable compression braking by modifing the valve timing. FIG. 3 illustrates a four-stroke cycle including a vacuum stroke by two-stroke (4 V/2 stroke) operating cycle varient that includes a constant volume/constant pressure combustion feature and which can be modified to include a variable compression braking feature by varying valve timing and which is suitable for transportion engine applications.

In FIG. 1, circular axial-faced cams, C1 and C2, are represented in flat development with several views of an exemplary cylinder CYL illustrated between the opposed cam profiles of the cams. The cylinder CYL includes a divider valve DV in either an open or closed position; a piston P1 located between the divider valve and the cam C1 profile that defines the air/fuel mixture chamber; and a piston P2 between the divider valve and the cam C2 profile that defines the ignition-air chamber. The piston P1 is shown having a frusto-conical crown while the piston P2 is shown having a complementary indented crown. The divider valve DV is sloped to conform to the clearance envelop defined between the two pistons when they are at their respective top dead center positions. Each of the pistons P1 and P2 is connected to their respective cams C1 and C2 by cam follower mechanisms CF1 and CF2 that are schematically shown as spherical rolling members positioned between the pistons and the respective cam surfaces. Both of the cams C1 and C2 are mechanically coupled together by a direct shaft connection for rotation in the same direction. In FIGS. 1, 2, and 3, the shafting and/or other mechanical coupling is not shown for reasons of clarity. The several views 'a' . . . 'e' of FIG. 1 of the exemplary cylinder show the relative positions of the pistons P1 and P2 for various portions of the operating cycle.

The intake for each cylinder, for both ignition air and the air/fuel mixture, is through circumferentially positioned inlet ports IP located adjacent the bottom dead center position of the piston P1. The inlet ports IP are covered and uncovered by the motion of the piston P1 with the closed ports represented by the solid darkened fill. Cylinder exhaust is provided through circumferentially positioned exhaust ports EP that are located adjacent the bottom dead center position of the piston P2. The exhaust ports EP are covered and uncovered by the motion of the piston P2 with closed ports represented by the solid darkened fill.

The two-stroke by two-stroke (2/2 stroke) operating cycle of FIG. 1 can be best appreciated by first considering the portion of the operating cycle shown in position 'a' in which the pistons P1 and P2 are at or near their respective top dead-center positions, the divider valve DV is open to allow communication across the valve, and the profiles of the cams C1 and C2 are at a raised crest portion to constrain the pistons P1 and P2 near their top dead center positions to define a combustion chamber between the pistons.

Just prior to that portion of the operating cycle shown in position 'a', and as described more fully below, the divider valve DV was opened to allow high-pressure air compressed by the piston P2 (for example, by a compression ratio of 24:1) to enter the air/fuel mixture compressed between the face of the piston P1 and the divider valve DV to cause ignition of the air/fuel mixture.

The end-stroke position of the piston P1 is controlled by the profile of its respective cam C1 to compress the air/fuel mixture by a selected compression ratio, such as 12:1. In general, the selected compression ratio provided by the piston P1 must be sufficiently high to maximize the heat output of the particular fuel though not high enough to risk unwanted pre-ignition or detonation. The air compressed by the piston P2 is compressed to a pressure sufficient to cause an adiabatic rise in its temperature to a temperature that is greater than the ignition temperature of the compressed air/fuel mixture on the opposite side of the divider valve DV; a compression ratio of 24:1 being generally sufficient. Since the compression ratio increases dramatically as the distance or head space between the faces of the pistons P1 and P2 and the divider valve DV decreases, the compression ratio can be accurately controlled by controlling the end-stroke position of the pistons by controlling the rise or 'lift' of the respective profiles of the cams C1 and C2. Additionally, as described more fully below in connection with FIGS. 4 and 5, the entire cam C1 can be advanced or retracted along its axis of rotation to vary the compression ratio of the air/fuel cylinder to thereby provide a very desirable variable compression feature. As can be readily appreciated by those skilled in the art, a variable and controllable compression ratio permits the use of different types and grades of fuel. For example, different grades of diesel or gasoline fuels, as well as other gaseous, liquid or particulate fuels (including high-energy fuels), can be burned by merely varying the compression ratio for optimum efficiency.

When the divider valve DV is open, the high pressure, ignition-temperature air compressed between the divider valve DV and the piston P2 enters the compressed air/fuel mixture compressed between the face of the piston P1 and the divider valve DV and causes the ignition thereof as indicated by the sinuous lines in position 'a' of FIG. 1. Since the divider valve DV has several circumferentially and equi-spaced ports, several ignition points or foci are started simultaneously causing a wave front that burns from the divider valve toward and to the face of the piston P1. The wavefront initially advances under constant pressure conditions because of the elastic, unburned air/fuel mixture between the advancing wavefront and face of the piston P1. Since the air/fuel mixture is localized during burning between the divider valve DV and the face of the piston P1, the combustion process can be considered as a "layered" or "stratified" process. Because of the relatively large volume of air compressed by the piston P2, a substantial excess of oxygen is available to support the burning air/fuel mixture regardless of the air/fuel ratio selected or the compression ratio by which the air/fuel ratio was compressed. As the air/fuel mixture burns, the pressure in the combustion chamber rises with the hot combustion products then passing through the opened ports of the divider valve DV to heat and mix with the comparatively larger volume of air in the chamber between the open divider valve DV and the face of the piston P2. As can be appreciated by those skilled in the art, complete high pressure combustion takes place with a large volume of excess oxygen available to support combustion of the fuel and the subsequent oxidation of any un-burned or partly burned hydrocarbon molecules in the exhaust products. The excess oxygen, of course, is available to support any post-combustion processing of the exhaust gas including catalyst-prompted reactions requiring available oxygen.

The above-described ignition sequence by which the divider valve DV opens to introduce ignition-temperature air into the air/fuel mixture results in a considerably reduced ignition delay and an improved overall ignition sequence efficiency that is superior to both the conventional compression ignition and spark ignition engines. In the conventional compression ignition engine, the fuel is injected under considerable pressure into the cylinder as discrete droplets of varying sizes and traveling in diverse directions throughout the combustion chamber. Because of this, a physical delay period occurs during which the various droplets undergo partial vaporization to be surrounded by a zone of fuel vapor, the temperature of which then rises to that of the ignition temperature combustion air. When the initial fuel vapors begin to burn, a chemical delay takes place, during which the fuel vapor is consumed and during which the heat of combustion causes further vaporization of the remaining fuel droplets. As can be appreciated, some of the fuel begins burning while other of the fuel droplets still undergo fuel vaporization. As a result, the physical and chemical delay of conventional compression ignition engines can be quite extensive and not at all predictable. Conversely, in the spark ignition engine, the physical and chemical delay is less than that of the conventional compression ignition engines since the air/fuel mixture is in a homogenous state just prior to ignition. However, ignition occurs at a point source and spreads through the combustion chamber as an expanding wave front. In contrast to both the compression ignition and spark ignition engines, the ignition delay of the present invention is much reduced since the air/fuel mixture is in a homogeneous state just prior to ignition and ignition occurs, not as a single point as in spark ignition engines, but as multiple points in a common plane adjacent to the open divider valve DV to cause a burning wave front that advances from the open divider valve across the air/fuel mixture to the face of the piston P1 to cause the above-described layered or stratified combustion.

Because of the comparatively larger volume of excess air provided by the ignition air cylinder, the heat of combustion per unit weight of fuel in the air/fuel chamber is required to raise the temperature of a relatively larger mass of air provided from the ignition air cylinder so that the temperature differences between the beginning and the end of the expansion stroke will be relatively larger than in conventional compression ignition engines. As a result, an extension in efficiency is obtained over the efficiency of conventional compression ignition engines. This extended temperature difference obtained during the expansion stroke is facilitated, in part, by the shortened ignition delay described above.

As the cams C1 and C2 rotate, as shown, to allow the pistons P1 and P2 to retract in response to the substantial gas pressures developed during combustion towards their respective bottom dead-center positions. At least a portion of one or both of the declining profiles of the cams C1 and C2 during the expansion stroke of the pistons P1 and P2 may be configured to provide a highly desirable constant pressure combustion feature. Of course, the cam profiles are selected to minimize jump or change-over during the transition to the return profiles. As the pistons P1 and P2 are forced downward toward their respective bottom dead-center positions during the power stroke, the piston forces are translated by the returning cam profiles into the desired rotary motion. As can be well appreciated, the moment arm presented to both of the working pistons P1 and P2 during their power stroke is constant to provide a substantial mechanical efficiency advantage over conventional reciprocating crankshaft/connecting rod type engines in which the moment arm presented to the working piston during the power stroke is smallest when the gas pressure is highest (that is, at or just after top dead-center) and, conversely, the moment arm presented to the piston is greatest when the piston is moving toward bottom dead-center and the gas pressure has diminished by virtue of the volumetric expansion. In the various engines described herein, the torque output can be readily increased or decreased by increasing or decreasing the radii of the axial-face cams C1 and C2.

The pistons P1 and P2 continue their movement toward their bottom dead-center positions to enter the exhaust portion of the cycle, shown in position 'b' of FIG. 1, during which the piston P2 uncovers the exhaust ports EP to vent a substantial portion of the combustion products therethrough as indicated by the long-dashed arrows. When the exhaust ports are initially uncovered by the piston P2, the piston P1 is controlled by a short dwell portion of the cam C1 profile to permit the bulk of the combustion products to be exhausted and the internal cylinder pressure to drop to a level low enough to permit cylinder scavenging. At the end of this short dwell period, the cam C1 profile returns to cause the piston P1 to uncover the inlet ports IP to begin cylinder scavenging as shown in position 'c' of FIG. 1 and as indicated by the short-dashed arrow swirls. By the time the cylinder inlet ports IP are uncovered, the internal cylinder pressure has dropped to a pressure less than that of the pressurized inlet air which enters the cylinder through the now-uncovered inlet ports IP to sweep remaining exhaust gas products along the cylinder CYL, through the opened ports of the divider valve DV and then through the open exhaust ports EP to effectively remove the residual exhaust gas products and recharge the entire cylinder CYL with fresh inlet air, that is, the volume present between the divider valve DV and the piston P1 and the divider valve and the piston P2. As the inlet air sweeps through the divider valve DV desirable divider valve cooling takes place with the heat returned to the cylinder CYL2.

Upon completion of the scavenging portion of the operating cycle, as shown between positions 'c' and 'd' of FIG. 1, the divider valve DV closes and, substantially simultaneously therewith, the profile of the cam C2 rises to cause the piston P2 to advance, cover, and thereby close the exhaust ports EP so that the chamber between the now-closed divider valve and the face of the piston P2 contains a fixed charge of fresh air for subsequent compression as piston P2 continues to advance as described below. The position of the piston P1 is controlled so that the inlet ports IP remain open a short time after the divider valve DV is closed. During this time, fuel is injected into the inlet air by an appropriately controlled fuel injector through the still-opened inlet ports in the chamber defined between the face of the piston P1 and the closed divider valve DV. The quantity of fuel injected is sufficient to provide a desired air/fuel ratio. The air/fuel ratio selected is not limited to a narrow range as in the case of spark-ignition engines but can vary over a very wide ratio range, for example, from a low of 9:1 to an extremely high air/fuel ratio. The upper limit of the higher air/fuel ratio is determined by the power required to overcome mechanical friction and to compress the combustion and ignition air. Just subsequent to the fuel injection, the profile of the cam C1 changes over to an inclined rise to cause the piston P1 to advance to cover and thereby close the inlet ports IP as shown to the right of position 'd' of FIG. 1. At this time in the operating cycle, the divider valve DV remains closed and the chamber defined between the closed divider valve and the face of the piston P2 contains a charge of fresh air with minimum exhaust products, if any, and the chamber defined between the closed divider valve and the face of the piston P1 contains an air/fuel mixture of selected ratio.

The profile of the cam C1 continues to advance the piston P1 at position 'e' of FIG. 1 to compress its air/fuel mixture by a selected compression ratio, such as 12:1, this compression ratio being sufficient for use with most gasolines to effect maximum heat extraction without causing auto-ignition. The compression ratio could be lowered for lower octane gasolines and increased for certain diesel or kerosene type fuels. Simultaneously, the profile of the cam C2 continues to advance piston P2 toward its top dead-center position to compress its air charge by a selected compression ratio, such as 24:1; this compression ratio being suitable to cause an adiabatic rise in the temperature of the so-compressed air to a temperature greater than the ignition temperature of the compressed air/fuel mixture located on the opposite side of the closed divider valve DV.

At the completion of the compression stroke, both of the pistons P1 and P2 are at their respective top dead-center postions. At a moment shortly before or after the pistons P1 and P2 attain their top dead-center positions, the divider valve DV is opened to allow the hot, ignition-temperature and higher pressure air compressed between the divider valve DV and the face of the piston P2 to pass through the now-opened divider valve and enter and mix with the compressed air/fuel mixture to cause ignition thereof and repeat the cycle as described above.

In FIG. 1, the aforedescribed operating cycle occurs in 180° of cam rotation so that two full operating cycles occur within one 360° rotation of the engine. As can be readily appreciated, the cam profiles of the cams C1 and C2 can be readily changed so that more or less operating cycles can take place during each rotation of the engine.

FIG. 2 illustrates, in a manner similar to the flat development layout of FIG. 1, the operating cycle of a four-stroke by two-stroke (4/2 stroke) cycle in accordance with the present invention. FIG. 2 differs, in part, from FIG. 1 in using flat-topped pistons and in that the inlet ports IP of the FIG. 2 cylinder are located adjacent to the divider valve DV with inlet valving controlled by a rotatably mounted inlet valve IV mounted on the exterior of the cylinder CYL. The inlet valve IV, as described in more detail below, is rotatable between two positions and includes holes that alternately register with the inlet ports IP to effectively open the inlet ports and also offset from the inlet ports to effectively close them.

The operating cycle of FIG. 2 can be best understood by first considering position 'a' of FIG. 2 in which both pistons P1 and P2 are positioned at or adjacent to their top dead-center positions with the divider valve DV open. Just prior to the components having attained this position, the divider valve DV had been opened to allow compressed ignition temperature air to pass from the chamber defined between the divider valve DV and face the piston P2 through the open ports thereof into the compressed air/fuel mixture in the chamber defined between the open divider valve DV and the face of the piston P1 with ignition in position 'a' of FIG. 2 indicated by the sinuous lines.

The pistons P1 and P2 are held in the position shown in position 'a' of FIG. 2 by dwell portions of their respective cams C1 and C2 to provide the desirable and efficiency enhancing attributes of constant volume combustion. The advantages of constant volume combustion are outlined, for example, in Degler, H. E., "Internal Combustion Engines", John Wiley & Sons, 1938, pp. 77 to 98, and Obert, E. F. "Internal Combustion Engines and Air Pollution", Harper & Row, 1973, pp. 166 to 175. Since the pistons P1 and P2 are held in their respective positions adjacent to or near their respective top dead-center positions to define a constant volume combustion chamber, the air/fuel mixture burns in a desirable and an advantageous constant volume conditions, in contrast to other types of reciprocating engines in which the piston is forced towards its bottom dead-center position during the combustion process to cause a moderation in the development of the maximum cylinder pressure and, oftentimes, a quenching of the combustion process that leads to less than optimum operating efficiency and unburned combustion products in the exhaust gases. As the air/fuel mixture burns, the pressure in the now-constant volume combustion chamber rises with the hot combustion products then passing through the opened ports of the divider valve DV to heat and mix with the comparatively larger volume of air in the chamber between the open divider valve and the face of the piston P2.

As the combustion process takes place, both of the cams C1 and C2 rotate until their respective profiles decline to allow the pistons P1 and P2 to begin retraction toward their respective bottom dead-center positions in response to the increase in the gas pressure developed during the combustion phase. As the pistons P1 and P2 retract, the piston forces are imparted to the returning profiles so that cams C1 and C2 are caused to rotate.

The pistons P1 and P2 continue their power stroke toward their respective bottom dead-center positions at which point the piston P2 uncovers the exhaust ports EP in position 'b' to cause the expanded relatively lower pressure combustion products to exit the cylinder. Concurrently with the uncovering of the exhaust ports EP, the profile of the cam C1 rises to advance the piston P1 toward its top dead-center position, as shown in position 'b' of FIG. 2, to provide a piston-assisted exhaust ram or 'push-out' movement. The amount of the piston P1 advance is, of course, controlled by the rise profile of the cam C1 but generally the piston P1 should be at least advanced to or adjacent to the inlet ports IP as shown in position 'c' of FIG. 2. When the piston P1 reaches the maximum extent of its exhaust removal assist, the cam profile for the cam C1 changes to a short dwell, and a short scavenge phase takes place. During the scavenge phase, which takes place with the components positioned as shown in position 'c' of FIG. 2, the inlet ports IP are opened by appropriate control of the rotatable inlet valve IV to allow fresh pressurized inlet air into the chamber defined between the face of the now-advanced piston P1 to sweep through the open ports of the divider valve DV through the chamber defined between the divider valve DV and the face of the piston P2 and out through the still uncovered exhaust ports EP. The air flow through the cylinder during the scavenge phase of the cycle assists in cooling the divider valve DV and returning heat to the cylinder CYL2 and cooling the faces of the pistons P1 and P2. Upon completion of this piston-assisted exhaust/scavenge phase of the cycle, the profile of the cam C2 changes to a rising profile to cause the piston P2 to advance and thereby cover the exhaust ports EP and the divider valve DV is closed as shown between positions 'c' and 'd' of FIG. 2. In this way, the chamber defined between the now-closed divider valve DV and the now-covered and closed exhaust ports EP is charged with fresh air for subsequent compression to a temperature above the ignition temperature of the air/fuel mixture to be combusted.

Concurrently with the compression of the fresh air charge in the chamber between the divider valve DV and the face of the piston P2, the profile of the cam C1 declines and the piston P1 retracts to effect a volumetric expansion and pressure reduction to aspirate an air and a fuel charge through the opened inlet ports IP as indicated by the solid swirling lines in position 'd'. The air/fuel mixture can be introduced into the cylinder by normal intake stroke aspiration, or preferably, under pressure as supplied through a super- or a turbocharger. In addition, the fuel can be premixed outside the cylinder, for example, by carburation or by injecting fuel from a fuel injector into the inlet air flow prior to the inlet air passing through the opened inlet ports in the combustion chamber. The inlet air flow channels, the inlet ports, and the combustion chamber are configured to provide a swirl pattern to swirl the air/fuel mixture in the combustion chamber and to provide a turbulence in the flow which creates an increase in the air/fuel mixing efficiency, and decreases the physical delay period. The decrease in the physical delay period assists in decreasing the chemical delay period and thereby shortens the overall ignition delay period. In addition to mixing the fuel outside the combustion chamber, fuel can be injected directly through the opened inlet ports into the combustion air/fuel chamber itself where the turbulent swirl pattern effects the air/fuel mixing. Once the air and fuel mixture is introduced into the cylinder, the inlet valve IV is closed between positions 'd' and 'e' of FIG. 2.

The cam profiles of the cams C1 and C2 in position 'e' respectively rise to cause the piston P1 to compress the air/fuel mixture between it and the closed divider valve DV by a selected compression ratio, such as 12:1. The compression ratio, as discussed above, is selected to effect efficient utilization of the heat energy in the fuel while not high enough to risk undesirable pre-ignition. Concurrently, the piston P2 compresses the fresh air charge in the chamber defined between the piston P2 and the closed divider valve DV by a selected compression ratio, such as 24:1; this compression ratio being sufficient to cause an adiabatic rise in the temperature of the so-compressed air to a temperature greater than ignition temperature of the less highly compressed air/fuel mixture on the opposite side of the closed divider valve DV.

Since small changes in the head space defined by the respective top dead-center positions of the pistons P1 and P2, in light of their relative strokes, can cause meaningful changes in the compression ratio, the lifting or rising profiles of each of the cams C1 and C2 can be easily controlled to control the respective compression ratios. Also, and as described more fully below in relationship to the embodiments of FIGS. 4 and 5, the entire cam C1 can be advanced or retracted along its axis of rotation to change the compression ratio to accommodate different grades and types of fuels.

When both the pistons P1 and P2 achieve their ultimate top dead-center positions, the divider valve DV is opened to allow the relatively high pressure compressed air in the chamber between the divider valve DV and the piston P2 to pass through the open divider valve DV ports into the less highly compressed air/fuel mixture and cause ignition thereof. Ignition foci develop adjacent to the opened divider valve DV to cause a wave front that burns from a zone adjacent to the opened divider valve DV toward and to the face of the piston P1 to effect the aforedescribed "layered" or "stratified" combustion, this ignition being represented in position 'a' of FIG. 2 by the sinuous lines.

The combustion process takes place under desirable constant volume conditions as established by the cam profiles of the cams C1 and C2 to thereby allow the pressure within the cylinder to rise. Thereafter, the profiles of the cams C1 and C2 both decline to allow expansion during the power stroke as described above.

The operating cycle shown in FIG. 2 is completed in 180° of engine shaft rotation with two full cycles completed during one full revolution of the engine; as can be appreciated, the cam profiles can be modified to permit a greater or lesser number of cycles per engine revolution.

The operating cycle of FIG. 2 includes a desirable compression braking mode that is achieved by controlling the divider and inlet valve timing. As shown in position 'a' of FIG. 2, the compression braking cycle begins with the pistons P1 and P2 at their respective top dead center positions and the divider valve and inlet valve in their opened positions. As the cams C1 and C2 rotate, both the pistons P1 and P2 retract toward and to their respective bottom dead center positions and aspirate a fresh air charge through the opened inlet valve ports. The profile of the cam C1 is such that the piston P1 advances towards its top dead center position while the piston P2 remains adjacent its bottom dead center position as indicated at positions 'b' and 'c' of FIG. 2. When the piston P1 reaches its top dead center position, the divider valve DV is closed and the piston P2 begins its compression stroke to compress its air charge between it and the now-closed divider valve. The profile of the cam C1 declines causing the piston P1 to retract toward and to its bottom dead center position to re-aspirate an air charge. When the piston P1 attains its bottom dead center position, the inlet valve is closed and thereafter, the rising profiles of the cams C1 and C2 cause the pistons P1 and P2 to advance toward and to their respective top dead center positions to compress their respective air charges. When the pistons P1 and P2 attain their respective top dead center positions, as illustrated in position 'e' of FIG. 2, the divider valve and inlet valve are opened to release the now-compressed air. A more detailed description of the variable compression features is presented below with regard to the embodiment of FIG. 4.

As can be appreciated, the compression braking mode is variable; that is, the amount of compression braking can be controlled by controlling the opening and closing timing of the divider valves and inlet valves. Thus, the compression braking effect can be modified by opening the divider valve and inlet valve at some time prior to the pistons P1 and P2 attaining their top dead center positions as illustrated in position 'e' of FIG. 2 and also by closing the divider valve and/or the inlet valves prior to a full air charge entering the cylinder for subsequent compression by the pistons P1 and P2.

FIG. 3 illustrates, in a manner similar to the flat development layouts of FIGS. 1 and 2, the operating cycle of a four-stroke cycle which includes a vacuum stroke by two-stroke (4 V/2 stroke) operating cycle in accordance with the present invention. The operating cycle and components shown in FIG. 3 differ from those shown in FIG. 1 in that a variable compression braking feature is provided, which braking feature is desirable for engines used in transportation applications, pistons having frus-to-conical crowns are used, and the divider valve is defined by a sliding block type valve having a single aperture, hole, or slot.

The operating cycle of FIG. 3 can be best understood by first considering position 'a' of FIG. 3 in which both pistons P1 and P2 are positioned at or adjacent to their respective top dead center positions with the divider valve DV open. Just prior to the components having attained the position illustrated in position 'a' of FIG. 3, the divider valve DV had been opened to allow compressed ignition-temperature air to pass from the chamber defined between the divider valve DV and the face of the piston P2 through the open port of the divider valve into the compressed air/fuel mixture in the chamber defined between the open divider valve DV and the face of the piston P1 to cause ignition as indicated by the sinuous lines.

The pistons P1 and P2 are held in the positions shown in position 'a' of FIG. 3 by dwell portions of their respective cams C1 and C2 to provide the desirable and efficiency enhancing attributes of constant volume and constant pressure combustion. Thereafter, and as the combustion process takes place, both of the cams C1 and C2 advance through a short constant volume combustion section until their respective profiles begin to decline through a constant pressure combustion section to allow the pistons P1 and P2 to retract toward their respective bottom dead center positions in response to the increase in gas pressure developed during combustion. As the pistons P1 and P2 retract, the piston forces are imparted to the respective returning or declining profiles to cause the cams C1 and C2 to rotate. The pistons P1 and P2 continue their power stroke toward their respective bottom dead center positions at which point, as shown in position 'b' of FIG. 3, the piston P2 uncovers the exhaust ports EP to cause the expanded, relatively lower pressure combustion products to exit the cylinder CYL. A scavenging fan SF or the equivalent is provided to assist in removing and partially evacuating the exhaust gases from the chamber while the inlet ports IP remain closed by the piston P1 as controlled by a short dwell period on the cam C1. As shown in FIG. 3, a gas turbine GT can be positioned downstream from the scavenging fan SF to extend the expansion stroke. The cam C1 profile then returns to allow the piston P1 to uncover the inlet ports IP to begin cylinder scavenging between positions 'b' and 'c' of FIG. 3. By the time the inlet ports IP are uncovered, the internal pressure of the partially evacuated cylinder has dropped to a level less than that of the inlet air which enters the cylinder through the now-uncovered inlet ports IP to sweep the remaining exhaust gas products along the cylinder CYL, through the opened ports of the divider valve DV, and then through the exhaust ports EP to effectively remove the residual gas products from the cylinder and recharge the entire cylinder with fresh inlet air which also serves to cool the divider valve DV. The flow of inlet air cools CYL1, the divider valve DV, returns heat to the cylinder CYL2, and, in addition, cools the crowns of the pistons P1 and P2.

Upon completion of the scavenging portion of the operating cycle, just to the right of position 'c' of FIG. 3, the profile of the cam C2 rises sufficiently to cover and close the exhaust ports EP and then enters a dwell portion while the profile of the cam C1 changes to a rising profile to advance the piston P1 toward the still-open divider valve to effect compression of the fresh inlet air charge in the chamber defined between the open divider valve and the face of the piston P2. This "ram precompression" stroke is completed when the piston P1 attains the crest of the rising portion, which crest occurs just after the position 'd' of FIG. 4, at which point the divider valve DV is closed. The ram precompression stroke effectively supercharges the cylinder between the divider valve DV and the face of the piston P2. Thereafter, and as shown in position 'e' of FIG. 3, the profile of the cam C1 declines to retract the piston P1 to develop a partial vacuum in the chamber between the face of the piston P1 and the now-closed divider valve DV. Concurrently, the profile of the cam C2 rises to cause the piston P2 to advance toward the closed divider valve and compress its fresh air charge by a selected compression ratio, such as 24:1.

As shown just prior to position 'f' of FIG. 3, when the piston P1 reaches its bottom dead center position, the inlet ports IP are uncovered and inlet air, either at ambient atmospheric pressure or pressurized above ambient atmospheric pressure, is aspirated into the chamber between the face of the piston P1 and the closed divider valve DV with the partial vacuum developed by the piston P1 during its retraction stroke of position 'e' of FIG. 3 assisting in the aspiration of the air charge. Fuel may be injected into the inlet air and through the uncovered inlet ports IP during aspiration, or fuel may be premixed in a carburetor with the inlet air during aspiration.

After the air and fuel enter the chamber between the face of the piston P1 and the divider valve DV, the profile of the cam C1 rises to advance the piston P1 toward its top dead center position to effect compression of the air/fuel mixture by a selected ratio, such as 12:1. While the piston P1 is advancing toward its top dead center position, the piston P2 continues advancing toward its respective top dead center position to compress the ignition air charge and cause an adiabatic temperature increase to a temperature greater than the ignition temperature of the air/fuel mixture in the adjacent chamber. When both the piston P1 and the piston P2 attain their respective top dead center positions, the divider valve DV is opened to cause hot ignition-temperature air from the chamber defined between the face of the piston P2 and the divider valve DV to pass into the compressed air/fuel mixture defined between the face of the piston P1 and the divider valve. The ignition air, as described above, causes an ignition foci which develops a burning wave front that advances from the divider valve toward the the piston P1.

The burning and expanding combustion gases in the aforedescribed layered or stratified combustion zone between the piston P1 and the opened divider valve than pass through the open divider valve to heat the ignition air charge and cause both pistons P1 and P2 to retract during their respective expansion strokes.

The operating cycle of FIG. 3 can be utilized, by varying the timing of the divider valve, to achieve variable compression braking. The compression braking cycle is initiated with the pistons P1 and P2 at their respective top dead center positions and the divider valve opened as shown in position 'a' of FIG. 3. The profiles of the cams C1 and C2 decline to cause each piston P1 and P2 to retract toward and to their respective bottom dead center positions, the piston P2 first uncovers the exhaust ports with the piston P1 thereafter uncovering the inlet ports. When the inlet ports and the exhaust ports are uncovered, a fresh air charge is introduced into the cylinder. The profiles of the cams C1 and C2 then rise to cause the piston P2 to advance a short distance to close the exhaust ports. The piston P1 then advances toward its top dead center position to provide a ram assisted charging of cylinder CYL2 defined between the face of the piston P2 and the divider valve. When the piston P1 attains its top dead center position, just after position 'd' in FIG. 3, the divider valve DV is closed and the profile of the cam C2 rises to cause the piston P2 to compress the ram-assisted charge while the piston P1 then retracts, as shown in positions 'e' and 'f', to its bottom dead center position to uncover the inlet ports. When the piston P1 uncovers the inlet ports, the divider valve is opened to vent the air compressed by the piston P2 through the inlet ports IP. During the compression braking mode, the quantity of air admitted to the cylinder can be controlled by throttling the air flow. A more detailed description of the variable compression feature is provided below in relation to the embodiment of FIG. 4.

The table of FIG. 9 presents four sets, Groups I, II, III, and IV, of physical dimensions and related cylinder pressure information for exemplary air/fuel and ignition air cylinders. The information presented in FIG. 9 relates to the volumetric efficiency of the air/fuel and ignition air cylinders as each compresses their respective air charges and demonstrates how shortened air/fuel strokes for a set of otherwise fixed physical dimensions can increase overall volumetric efficiency of the engine. Within each grouping, the only working variable is the stroke length of the air/fuel piston with the remaining information representing the consequential result of the stroke length change of the air/fuel piston.

The information presented in each column of the table of FIG. 9 is defined as follows:

CYLINDER 15 psia

A/F Air-fuel cylinder charged with 15 psia at the beginning of the compression stroke.

Air Ignition air cylinder charged with 15 psia at the beginning of the compression stroke.

STROKE INCHES

A/F Air-fuel cylinder piston stroke, varying in each group from 3" to 1".

Air Ignition air cylinder piston stroke, remains a constant (3") in all four groups.

COMPRESSION RATIO

A/F Air-fuel cylinder compression ratio, a constant in each group, varies from group to group.

Air Ignition air cylinder compression ratio, a constant in groups I, II and III, changes to a different value in group IV.

CLEARANCE SPACE

A/F Clearance or head space in air-fuel cylinder at the end of the compression stroke before the divider valve opens.

Air Clearance or head space in the ignition air cylinder at the end of the compression stroke before the divider valve opens.

TOTAL STROKE

The combined strokes of air-fuel cylinder piston and ignition air cylinder piston; can be considered as the total expansion stroke after the divider valve opens.

CLEARANCE SPACE'

The combined clearance space between air-fuel cylinder piston and the ignition air cylinder piston after the divider valve opens.

EXPANSION RATIO

The figures in this column can be considered as a final composite compression ratio. As can be appreciated, for example, gasoline can be burned between ratios of 12:1 to 20:1.

CYLINDER PRESSURE

A/F Air/fuel cylinder pressure (with no heat added) before the divider valve opens.

Air Ignition cylinder pressure (with no heat added) before the divider valve opens.

PRESSURE FACTOR

The pressure factor column indicates the quantitative pressure contribution of the air/fuel and ignition air cylinders to the FINAL PRESSURE column. The pressure factor is obtained for a cylinder by multiplying the cylinder pressure by a ratio of the clearance space for that cylinder divided by the combined CLEARANCE SPACE'. For example and as illustrated by the calculations below the Group IV information, the first and second rows of information in Group I indicate the air/fuel and ignition air cylinders have clearance space of 0.375" and 0.125", respectively, for a total CLEARANCE SPACE' of 0.500". The air/fuel cylinder contributes 75% (0.375/0.500) of the total CLEARANCE SPACE' while the ignition-air cylinder contributes 25% (0.125/0.500). Since the air/fuel cylinder provides a pressure of 120 psi prior to the divider valve opening, the air/fuel cylinder provides a contribution of 90 psi (75%×120) and the ignition air cylinder provides a contribution of 90 psi (25%×360) to the final pressure of 180 psi.

FINAL PRESSURE

Composite pressure, the result of combining the clearance space pressures of the air-fuel and the ignition cylinders after the divider valve is opened.

% GAINED ( ) The figures enclosed in parentheses indicate the percentage of pressure gain within each group (I, II, III and IV) in which the A/F cylinder stroke is the only working variable. Note that in group I a change in the A/F stroke from 3" to 1" increased the final pressure from 180 psia to 240 psia, an increase of 33.3%.

[] The figures enclosed in brackets indicate the percentage of pressure gain over an 8:1 compression ratio with a cylinder pressure of 120 psia. Note in group III in the FINAL PRESSURE column the figure 288 (psia) represents a pressure increase of 140% (all pressure figures with no heat added).

It should be noted that the inventive cycle provides very large gains in final pressures and temperatures just before combustion, resulting in extremely high thermal efficiency. The addition of heat energy will provide a considerable increase in efficiency.

The final pressure developed in a cylinder is a combination of the pressure contributions of the air/fuel and ignition air cylinders and is a representation of the composite compression ratio and the composite expansion ratio. The final pressure can be varied for an application by varying those physical parameters that affect the cylinder pressure in the air/fuel and the ignition air cylinders and the pressure contribution each of these cylinders makes to the final pressure. Lengthening or shortening of the stroke of either or both of the air/fuel and/or ignition air cylinders will change the pressure developed in each of these cylinders and the pressure contribution of each to thereby change the final pressure. In the examples presented in FIG. 9, the air/fuel cylinder stroke was changed to effect a change in the final pressure. As can be appreciated by those skilled in the art, the stroke of the ignition air cylinder could have been likewise and with equal convenience changed to effect a similar change in a final pressure. In some applications, for example, it may be desirable to have a relatively long air/fuel cylinder stroke and short ignition air stroke.

Figure 4:
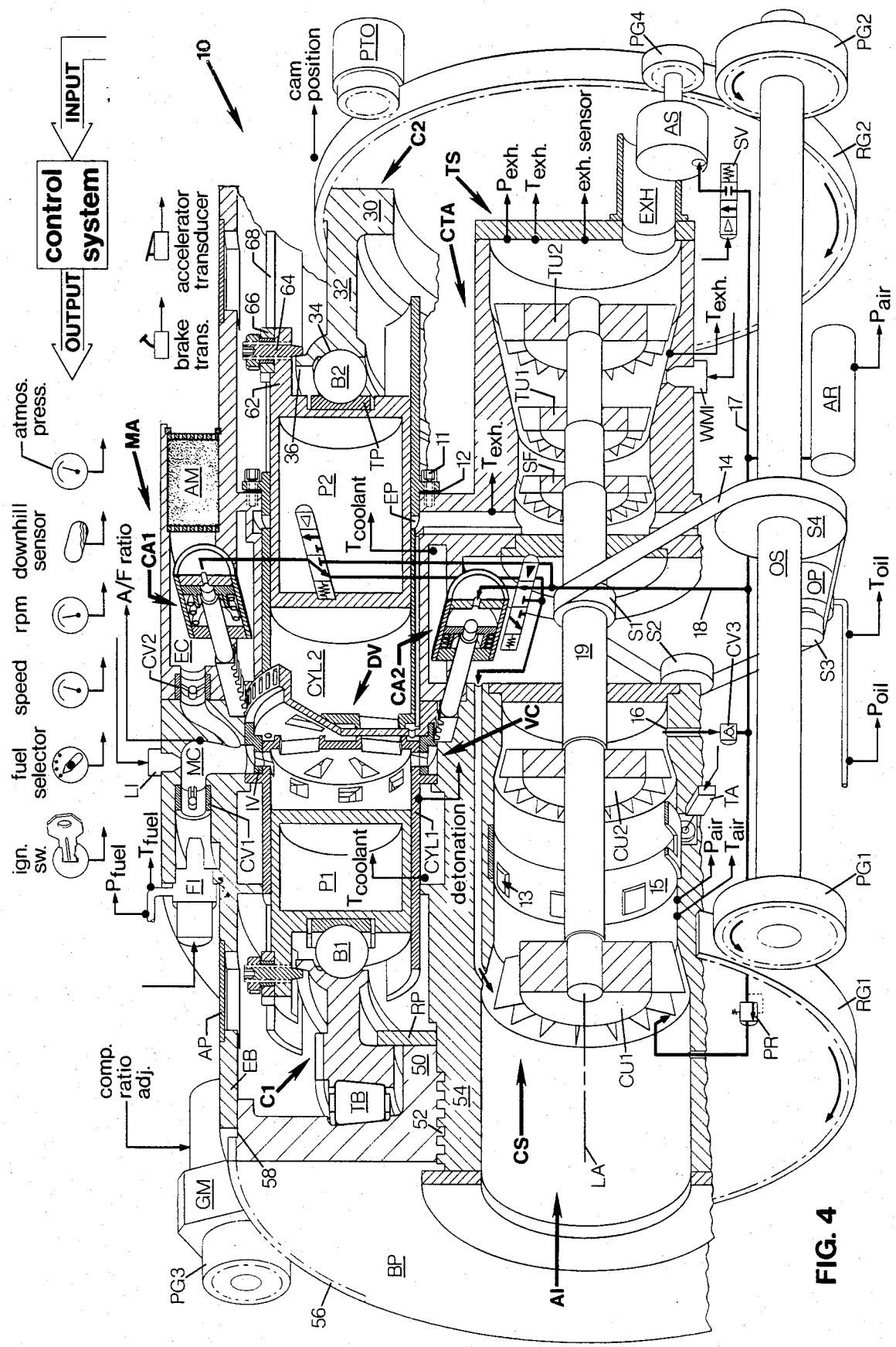
FIG. 4 is a partial, cross-section, isometric view of a preferred embodiment of an engine in accordance with the present invention with the selected parts thereof broken away, shown in schematic form, or omitted for reasons of clarity, and with selected transducers and actuators of a variable valve timing control system shown.
Figure 5:
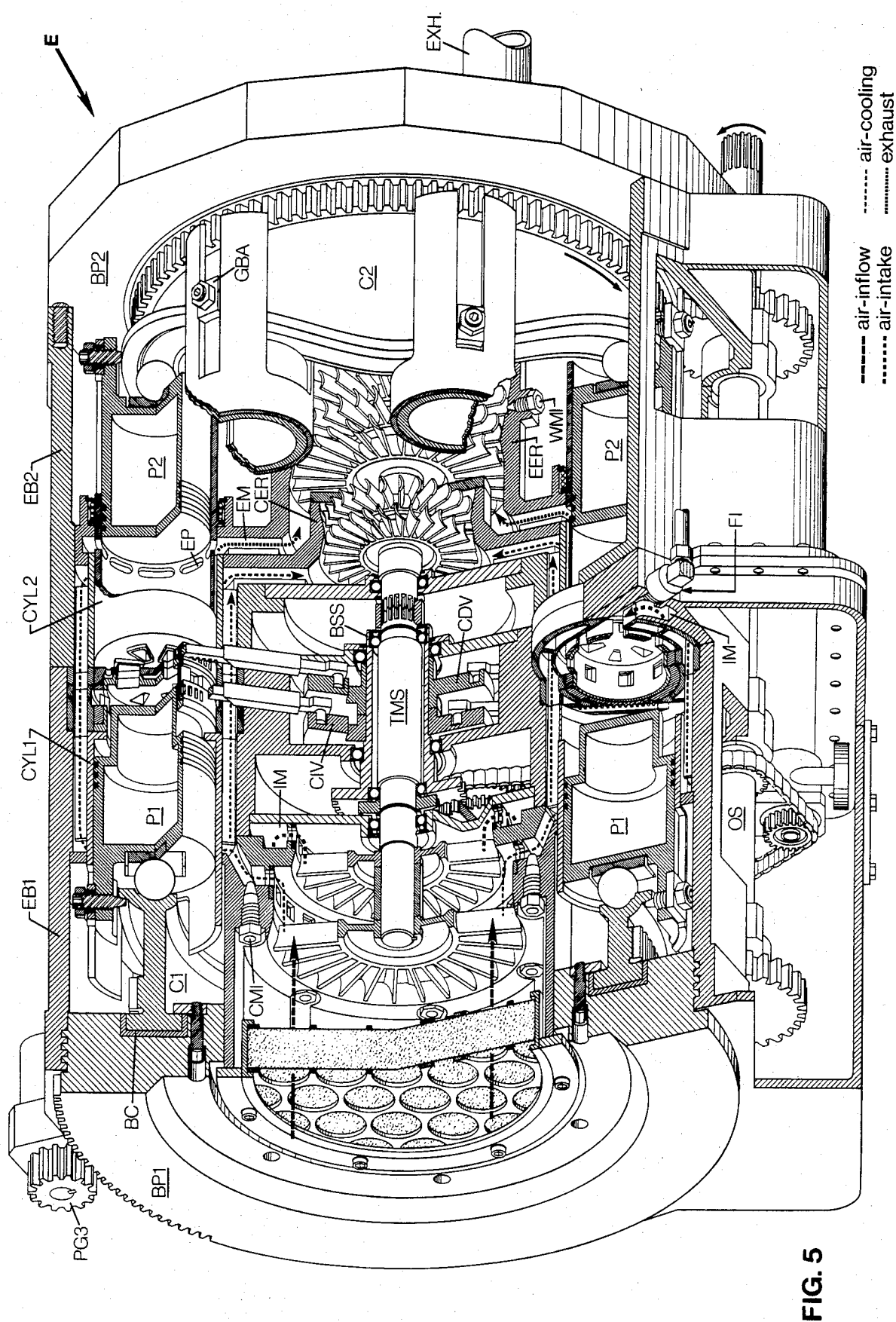
FIG. 5 is a cross-sectional view of a preferred embodiment of an engine in accordance with the present invention.

The various engine operating cycles described above as well as other cycles and variations thereof can be utilized in various engine configurations including the engine embodiments presented in FIGS. 4 and 5. One embodiment of an internal combustion engine in accordance with the present invention is shown in FIG. 4 and referred to therein by the reference character 10, and one preferred structural embodiment of an engine in accordance with the present invention as shown in FIG. 5. The engine 10 (FIG. 4) is defined about a longitudinally extending axis LA and includes a plurality of cylinders CYL1 . . . n aligned parallel to the longitudinal axis and equi-spaced about the longitudinal axis at a selected radius so that the cylinders CYL1 . . . n are positioned in a manner analogous to the cylinder of a revolver. Each cylinder CYL1 . . . n includes an inlet and divider valve cartridge assembly, generally referred to by the reference character VC, that divides the cylinder into a first cylinder half CYL1 and a second cylinder half CYL2. The cylinder halves CYL1 and CYL2 are designed to receive a respective air/fuel charge and an ignition air charge, as described above in relation to FIGS. 1, 2, and 3. The cylinder halves CYL1 are designed as insertable sleeves that are carried in a left-side engine block section while the cylinder halves CYL2 are likewise designed as insertable sleeves and carried in a complementary right-side engine block section that is preferably bolted to the first engine block section with the valve cartridges VC retained in place in appropriately sized cartridge receiving cavities. In FIG. 4, various connecting bolts, pilot pins, and/or piloting surfaces for mating the respective engine block sections are not shown. As can be appreciated, the split-block construction, the cartridge nature of the valving, and the insertable cylinder sleeves provide an engine that can be readily assembled and disassembled.

A piston P1 is located on the one side of the valve cartridge VC in the cylinder half CYL1 for compressing an air/fuel mixture between it and the valve cartridge VC while a piston P2 is located on the opposite side of the valve cartridge VC in the cylinder CYL2 for compressing an ignition air charge between it and the valve cartridge VC. The pistons P1 and P2 advance towards one another toward and to respective top dead center (TDC) positions and retract away from one another toward and to respective bottom dead center (BDC) positions under the control of respective axial-face cams C1 and C2 which each have rising, declining, and dwell profiles that control the engine operating cycles as described above in more detail in connection with FIGS. 1, 2, and 3. The cams C1 and C2 are each supported for rotation about the longitudinal axis LA by back plates BP, only one of which is shown in FIG. 4. Each of the cams C1 and C2 carry external ring gears RG1 and RG2 (as schematically shown in FIG. 4) located on the peripheral surface thereof. Pinion gears PG1 and PG2, secured to an output shaft OS, engage the ring gears RG1 and RG2 of each cam C1 and C2 and rotate the output shaft OS in response to the rotation of the cams C1 and C2. In operation, and as explained in more detail below, the pistons P1 and P2 reciprocate in their respective cylinder halves CYL1 and CYL2 to cause the cams C1 and C2 to rotate, which rotation is transferred to the output shaft OS.

One or more power take-off devices PTO, including engine-operated accessories, can be mounted on the engine and driven by the ring gears RG1 or RG2. A compounded turbocharger assembly is located in the central or 'core' portion of the engine and is generally designated by the reference character CTA. The compounded turbocharger assembly CTA includes a turbine section TS which extracts energy from the exhaust gas products and a connected compressor section CS that provides a source of pressurized inlet air for engine combustion and compressed air for a pneumatically-controlled actuator system, as explained more fully below.

The cams C1 and C2, as shown in FIG. 4, are of the axial face type and have a generally circular base 30, a cylindrical axially-extending portion 32 that terminates with a curvilinear trackway 34, and a radially outwardextending rim or lip 36. Both the trackway 34 and the rim 36 engage cam follower mechanisms of the various pistons P1 and P2 as described more fully below. The circular base 30 of each cam C1 and C2 engages a thrust bearing TB interposed between the cam and the supporting back plates BP. The thrust bearing TB can take various forms including the tapered roller bearing arrangement shown in FIG. 4 as well as other thrust bearing configurations including pad-type plain bearings. The cams C1 and C2 are designed to rotate about the longitudinal axis LA to control piston motion while supported for such rotation by the back plates BP.

As shown by the exemplary back plate BP on the left in FIG. 4, the back plates BP are of a generally annular construction with the outside diameter surface portion including an external machined surface 58 (seals not shown) that is received or telescoped within a mating inside diameter pilot surface formed in the supporting left-side engine block section EB for relative sliding motion therebetween along the longitudinal axis LA.

The central portion of the back plate BP is open to define an air inlet AI, as shown, and includes an axially-extending back plate sleeve 50 that carries internal threads at 52, such as square or Acme-type threads, for engaging complementary external threads on an internal support cylinder 54 of the left-side engine block EB. The inward end of the back plate sleeve 50 carries a circular retainer plate RP that retains the cam C1 in place between it and the above-described thrust bearing TB. A peripheral portion of the back plate BP carries a gear tooth sector 56. A gear motor GM is mounted on the left-side block half EB and carries a pinion gear PG3 on its output shaft that engages the gear tooth sector 56 to effect variable compression. As can be appreciated from the foregoing, operation of the gear motor GM to rotate its pinion gear PG3 to, in turn, cause limited angular rotation of the back plate BP about the longitudinal axis LA causes the back plate BP and its cam C1 to advance or retract along the longitudinal axis LA to vary the operational range of the pistons P1 to effect variable compression control. The inward axial motion of the adjustable back plate BP is limited by a shoulder formed on the support cylinder 54 while outward axial motion is limited by an annular ring located on the outward end of the support cylinder 54. The variable compression adjustment can be performed during engine operation to optimize engine performance for different types and grades of fuels, engine speeds, loads, and environmental conditions.

Each of the pistons P1 and P2 is connected to respective cams C1 or C2 by an associated cam follower mechanism, several embodiments of which are shown in FIGS. 8A, 8B, 8C, 8D, and 8E, as described in more detail below. The illustrated cam follower mechanism of FIG. 4 for connecting the piston P2, for example, to the cam C2 includes a rolling element, such as a spheroid or ball B2, interposed between the ball receiving trackway 34 of the cam C1 and a ball-receiving thrust pad TP retained in a pad receiving cavity in the base of the piston P2. The ball B2 serves to transmit the operating forces between the cam C2 and the piston P2 while minimizing friction therebetween. The cam follower mechanism described is, of course, also utilized to connect the pistons P1 to their cam C1.

The piston P2 includes an axially extending skirt 62 through which a threaded retainer screw 64 extends. The screw 64 passes through a guide block 66 that rides within a longitudinally extending guide slot 68 formed in the cylinder skirt (only one side of the slot being shown in FIG. 4), and is adjustably retained in place by a locknut. The inward, conically tapered end of the retainer screw 64 engages and slides relative to the under surface of the outwardly extending rim 36.

Access to the retainer screws 64 and their locknuts of each cam follower to effect adjustments may be had via removable access plates AP and access openings formed in the left- and right-side block sections As can be appreciated, the various cam followers constrain their respective pistons P1 or P2 to follow the cam profiles.

The valve cartridge VC assembly is located between the two cylinder halves CYL1 and CYL2 and between the faces or crowns of the two pistons P1 and P2. As shown in FIG. 4 and in the enlarged detail of FIG. 6, the valve cartridge VC includes a first stationary valving disk VD1, a second stationary valving disk VD2 spaced from the first stationary valving disk VD1, and a rotatably mounted intermediate disk ID positioned between the two stationary valving disks VD1 and VD2. Both of the stationary valving disks VD1 and VD2 can be formed, if desired, integral with the end portions of their cylinder halves CYL1 and CYL2. Each of the stationary valving disks includes a plurality of equi-spaced sector-shaped through openings 82 that are in registration with one another. The rotatable intermediate disk ID includes through openings 84 of equal number and general shape as those of the stationary valving disks VD1 and VD2 so that the intermediate disk ID can be moved between an open position in which the openings or ports 82 and 84 are in registration to permit communication across the valve cartridge VC and a closed position in which the openings 82 and 84 are out of registration with one another. Both stationary valving disks VD1 and VD2 include raised sealing rims or pads 86 that bear and seal against the rotatable intermediate disk ID. Any gas leakage across the sealing pads 86 is bypassed into bypass passageways 88 that communicate with vent opening 90 that extends through the intermediate disk ID to permit gas flow thereacross and a passageway 92 that leads to the exhaust gas chamber described more fully below.

The intermediate disk ID is constrained for rotation in a combined mounting ring and inlet valve sleeve VS with mounting surfaces defined as shown. A peripheral surface portion of the rotatable intermediate disk ID carries indentations 100 that are designed to engage the teeth of a gear rack GR1 which, in turn, is connected to a pneumatic control actuator CA1, described more fully below, which effects opening and closing of the divider valve in timed relationship with the motion of the other engine parts.

The inlet ports IP are formed through the wall portion of the cylinder half CYL1 generally adjacent to the valve disk VD1. The inlet valve sleeve VS is mounted for rotation on a peripheral surface portion of the cylinder CYL1 and includes inlet ports of like number, size, and shape to the inlet ports IP formed through the cylinder wall. When the inlet valve sleeve VS is rotated so that the inlet ports are in registration, the interior of the cylinder CYL1 is opened to a pre-inlet mixing chamber MC of the air inlet manifold IM. The lower peripheral portion of the inlet valve sleeve VS includes indentations of like size and shape to the indentations 100. Another gear rack GR2 engages the inlet valve sleeve VS and is connected to a pneumatic control actuator CA2 of the control system that effects alternate opening and closing of the inlet valve sleeve VS as described more fully below.

The cylinder portion CYL1 includes a circumferential flange 110, one side of which abuts shoulder 112 and the other side of which retains the inlet valve sleeve VS.

In the assembled form, as shown in FIG. 4, the cylinder CYL1 is secured in place in a cylinder-receiving bore of the left-side block, the cylinder CYL2 is adjustably mounted in place in a similar cylinder-receiving bore in the right-side block, and the various parts of the divider valve DV are located between the two inwardly facing ends of the cylinders CYL1 and CYL2. The cylinder CYL2 is adjustable to control the clearance and fit between the stationary and intermediate valving disks. Adjustment shims 12 are retained in place by threaded fasteners 11 that pass through an apertured flange of the cylinder CYL2 and engage a bulkhead on the right-side block.

The compounded turbocharger assembly CTA occupies the central or core portion of the engine and includes a turbine section TS and a compressor section CS with compressor units CU1 and CU2 for providing pressurized inlet air and a compressed air supply where, as shown in the FIG. 4 embodiment, pneumatic valve controllers are used. The turbine section TS includes a scavenging fan SF and turbine units TU1 and TU2 for extracting useful energy from the expanded combustion products.

The compressor section CS includes a first compressor unit CU1 secured to the rotatable shaft 19. The compressor unit CU1 induces inlet air through the central air inlet opening AI in the back plate BP and provides an initial pressurization thereof. A circumferential shutter 15, controlled by a throttle actuator TA, is circumferentially mounted in the chamber defined between the compressor units CU1 and CU2 and is rotatable to control inlet air flow through circumferential ports 13 into internal engine air flow passageways and the inlet air manifolds (not specifically shown). A second compressor unit CU2 provides compressed air with this compressed air being provided through an outlet opening 16 to the engine pneumatic system supply, described more fully below.

The turbine section TS includes a scavenging fan SF and first and second turbine units TU1 and TU2 that are secured to the rotatably mounted shaft 19 for rotation therewith. Exhaust gases enter the exhaust gas chamber from various peripheral exhaust ports EP and pass through the scavenging fan SF and turbine units TU1 and TU2 where usable energy is extracted and the exhaust thereafter passing through the exhaust pipe EXH.

One or more water mist injectors WMI are positioned between the turbine units TU1 and TU2 and for the purpose of injecting a water mist into the exhaust gas flow. The water mist is converted to steam and thereby (a) removes thermal energy from and cools the exhaust gas flow and (b) increases the mass flow through the turbine unit TU2 to enhance energy extraction from the exhaust gas flow.

The compounded turbocharger assembly CTA is connected to the engine output shaft OS, as shown schematically in FIG. 4, by an endless belt 14, such as a chain or cogged belt, that is entrained about cooperating sprockets or pulleys including a sprocket S1 secured to the shaft 19, an idler sprocket S2, a sprocket S3, mounted on the input shaft of an engine oil pump OP, and a sprocket S4 mounted on the engine output shaft OS.

At low engine speeds, energy may be delivered from the output shaft OS to the shaft 19 to drive the inlet air compressor units CU1 and CU2, while at higher engine power outputs, sufficient energy may be available from the exhaust gas flow so that sufficient power is extracted from the exhaust gas flow to drive the compressor units CU1 and CU2, with power in excess of that needed to drive the compressor section CS directed to the engine output shaft OS. Turbine lag or delay is eliminated because of the direct mechanical connection to the engine output shaft OS.

Fuel and air are introduced into the various cylinders by an external circumferential manifold assembly MA formed as a radial extension of the left-side and right-side block sections. The manifold assembly MA includes spaced axial openings each of which receives a fuel injector FI, such as a fuel injector of the electromechanical plunger-type. Each fuel injector FI is connected to a source of pressurized fuel and selectively injects a quantity of fuel across a manifold chamber 20 through a check valve CV1 such as the exemplary flap-type check valve shown (the function of which is discussed below) into the preinlet port mixing chamber MC that leads into the cylinder CYL1 when the sleeve inlet valve IV is open. Additionally, a liquid injector LI is mounted in a radially aligned bore to selectively inject a combustion enhancing liquid, such as water or water in solution with other substances, including methanol, octane enhancers where gasoline type fuels are used and cetane enhancers where diesel type fuels are used. The liquid injectors LI are each aligned so as to inject the combustion enhancing fluid into the preinlet port mixing chamber MC to intermix with the fuel charge injected by the above-described fuel injectors FI.

The operation of the fuel and combustion enhancing liquid injectors, FI and LI, is typically timed so that the desired fuel and combustion enhancing fluid will pass into the cylinder CYL1, during that time the inlet valve IV ports are open.

The inlet air supply for the entire engine is maintained by the above-described first compressor unit CU1 with the pressurized inlet air being provided through the throttle actuator TA controlled rotary shutter valve 15.

In addition to the air and fuel inlet structure described above, the external circumferential manifold assembly MA also includes an inlet air/air exhaust assembly that is utilized during compression braking as discussed more fully below. The inlet air/air exhaust assembly includes the lower portion of the mixing chamber MC and a passageway that leads from the mixing chamber MC through a check valve CV2, such as the exemplary flap-type check valve shown, into an expansion chamber EC to an air muffler AM that includes a sonic wave diffusing material constrained between two apertured retaining plates.

Overall thermal cooling for the engine shown in FIG. 4 is achieved by flowing coolant, such as water or water with a mixture of an antifreeze liquid, through various passageways. Coolant flow, temperature, and heat removal can be controlled through conventional means (not specifically shown in FIG. 4).

The operation of the various inlet air and divider valves shown in FIG. 4 is achieved through pneumatic actuation. The air supply for the pneumatic actuator system is provided from the pressurized inlet air from compressor unit CU1 with this inlet air compressed by the second compressor unit CU2. This compressed air is provided through a passageway 16 to a check valve CV3 to pneumatic control system air supply line 17. A pressure regulator PR connected to air supply line 17 returns excess air to the engine inlet in the region of the first compressor unit CU1 for maintaining engine air supply line pressure and returning excess pressurized air to the inlet in the interest of energy conservation. The main compressed air-supply line 17 is connected to an air receiver AR and to an engine air-starter AS through a normally closed, solinoid operated, spring return, two-way starter valve SV. The air starter AS is of conventional design and includes an air motor driving a pinion gear PG4 that engages or is engageable with the ring gear RG2 of the cam C2.

A branch air line 18 is provided from the main compressed air supply line 17 to the pneumatic control actuators CA1 and CA2 for each valve cartridge VC. As shown in the enlargement of FIG. 6, each pneumatic control actuator is of the single acting type and has a piston mounted for reciprocation within a cylinder with a spring resiliently urging the piston to its retracted position. An actuator rod extends from the piston through the cylinder end plate and is secured to the above-described gear racks which, in turn, engage the oscillating inlet valve sleeve VS or the oscillating intermediate disk ID of the divider valve DV as shown in FIGS. 4 and 6. The exhaust from each pneumatic actuator retains substantial energy in terms of its pressure and flow velocity. The air exhaust from each of the pneumatic actuators is passed through passageways to a region adjacent to the inlet side of the compressor unit CU1 where the energy is recovered by directing the air into the vicinity of the blades of the compressor unit. Additionally, the compressor unit CU1 serves to assist in the removal of the exhausted air from each pneumatic actuator because of the below-atmospheric pressure at the inlet of the compressor unit CU1 which provides for faster evacuation of the air from the pneumatic actuators to permit more rapid actuator cycling.

Control actuator valves CAV1 and CAV2, in the form of solinoid operated, spring return, three-way pneumatic valves as described below, are utilized to control the actuators CA1 and CA2.

The above-described pneumatic control system is operated in response to electrical signals provided from an electronic control system which monitors engine operating parameters and provides the appropriate timed control signals to the various fuel and combustion enhancing liquid injectors, FI and LI, as described above and the pneumatic control actuators CA1 and CA2 to provide variable valve timing throughout a wide range of engine speeds, loads, and operating conditions.

Various on-engine sensors are provided throughout the engine and other various off-engine sensors are provided to obtain operating parameters. The on-engine and off-engine sensors suitable for effecting engine operation are listed below in Table I.

TABLE I

| ON-ENGINE INPUT SENSORS | OFF-ENGINE INPUT SENSORS & SIGNALS |
|---|---|
| Fuel Pressure | Brake Transducer |
| Fuel Temperature | Acceleration Transducer |
| A/F Ratio | Throttle Position Transducer |
| Cam (rotary) position | Inclination (downhill) sensor |
| Detonation (knock) | Atmosphere pressure |
| Coolant Temperature | Fuel selection |

TABLE I-continued

| ON-ENGINE INPUT SENSORS | OFF-ENGINE INPUT SENSORS & SIGNALS |
| --- | --- |
| (CYL, CYL1, CYL2) | |
| Exhaust Temperature | Ignition (ON/OFF) |
| Exhaust Pressure | Compression Ratio Adjustments |
| Exhaust Sensors | |
| Constituents ($CO_X$, $NO_X$, $O_2$) | |
| Inlet Air Pressure | |
| Inlet Air Temperature | |
| Pneumatic System Air Pressure | |
| Oil Pressure | |
| Oil Temperature | |
| Engine RPM | |

The output of the various on-engine and off-engine sensors are supplied through an input port to the central control system which preferably takes the form of a microcomputer, for example, a single board computer containing a processor with at least one arithmetic and logic unit (ALU) and a plurality of associated working registers, a read-only memory (ROM) containing engine operating programs, a random access memory (RAM) for temporary data storage and manipulation, and analog/digital converters (A/D) for converting analog output of the analog type transducers and sensors to a digital value compatible with the single board computer.

The central control system processes the output of the various transducers and sensors in accordance with a previously stored engine operating program and provides output control signals, as listed below in TABLE II, to effect engine operation.

TABLE II

| | |
| --- | --- |
| Valve Control Actuators including variable timing | Compression adjuster |
| Divider Valve Control Actuator | Variable Compression Braking |
| Fuel Delivery (injectors, etc.) | Air Supply Controls |
| Inlet Manifold Liquid Injector | Start Sequence |
| Water Injectors | Cooling System Control |

In operation, the cams C1 and C2 rotate causing the various pistons P1 and P2 to reciprocate in their respective cylinders CYL1 and CYL2. Output power is directed by the rotating cams C1 and C2 to the output shaft OS as described above. The compounded turbocharger assembly CTA, at low speeds, obtains the power to pressurize the engine inlet air via its direct mechanical connection to the output shaft OS. Inlet air is inducted through the engine air inlet AI with an initial pressurization provided by the first compressor unit CU1 and compressed air provided by the second compressor unit CU2 to provide control system air. The pressurized inlet air is provided through the ports 13 of the rotatable throttling sleeve 15 to pass through various passages in the external manifold assembly MA to the cylinders CYL1. Exhaust gas flow is provided through the exhaust ports EP through various exhaust port passageways to the turbine section TS where the exhaust gas flow is passed through scavenging fan SF and the turbine units TU1 and TU2 to extract the useable power therefrom. The water mist injectors WMI inject a controlled quantity of water into the high temperature exhaust gas flow between the first and second turbine units TU1 and TU2 to remove heat energy from the exhaust gas by flashing to steam and thereby extracting energy removed from the exhaust gas flow.

The control system also provides control signals to the gear motor GM that controls the compression ratio of the engine to vary the compression ratio to optimize efficiency and match engine operation to the operating conditions and the load. This optimization and matching can be accomplished, for example, by increasing the compression ratio until such time that the detonation sensor just begins to detect the presence of pre-ignition during the compression stroke of the pistons P1. As can be appreciated, the use of the detonation sensor indirectly takes into account all those parameters that affect efficient engine operation including the type and grade of fuel being consumed, the engine load, and various environmental conditions. As can be appreciated by those skilled in the art, the variable compression ratio feature permits the engine to be optimally operated under all anticipated operating conditions including, as an example, transportation applications in which a vehicle can experience uphill, downhill, and level travel. For an engine using a medium octane gasoline fuel in a transportation application during level travel, the control system can automatically increase the compression ratio to a point just before detonation, for example, 12:1, to maximize engine output; upon the onset of uphill driving, the compression ratio can be lowered, for example, to 8:1, to minimize detonation; and, lastly, upon the onset of downhill driving, the compression ratio can then be increased or decreased without the presence of fuel during the variable compression braking mode, described below, to vary the now-desired engine braking contribution.

The engine described above utilizes a pneumatic actuator system to effect engine control. As can be appreciated, other types of actuators and actuator systems are suitable including hydraulic, electro-mechanical, and vacuum systems. For example, hydraulic systems are preferred in larger, slower engines and pneumatic or electro-mechanical systems are preferred in smaller, higher speed engines.

The engine described above includes a variable compression braking feature in which the engine can be configured as a variable energy absorbing compressor. The variable compression braking feature is useful in transportation applications, particularly in regulating vehicle speed during downhill travel of a vehicle, but also to assist in reducing vehicle speed when desired during level or uphill travel. Generally, the variable compression braking is accomplished by charging the cylinders with various quantities of air, compressing the air charge by a selected compression ratio and/or releasing the so compressed air before full compression in the engine. Speed can also be regulated by varying the amount of air in the cylinders during the compression braking mode by throttling the inlet air.

In the compression braking mode, the divider valve DV is desirably left in an open position while the inlet valve IV for each cylinder is periodically opened when the pistons P1 and P2 are at or near their respective top dead center positions. Each of the pistons P1 and P2 then retracts towards bottom dead center under control of their respective cams C1 and C2. During retraction, pressurized inlet air passes through the low pressure check valve CV1 adjacent to the fuel injector FI until the pistons P1 and P2 are at or near their bottom dead center positions thereby charging the cylinder with a fresh air charge. Fuel or combustion enhancing fluid is not injected into the inlet air during the compression braking mode. When the pistons P1 and P2 reach their respective bottom dead center positions, the inlet valve IV is closed. On the subsequent compression stroke, the pistons P1 and P2 compress the fresh air charge as they move toward and to their top dead center positions. Upon attaining the top dead center position when the air charge is fully compressed, the inlet valve IV is once again opened to allow the now-compressed air charge to vent through the passageway that starts at the lower end of the mixing chamber MC into the preinlet port mixing chamber and leads to check valve CV2. The low pressure check valve CV1 adjacent to the fuel injector FI snaps closed while the second low pressure check valve CV2 then opens to allow the now-compressed air charge into the expansion chamber EC and on to the air muffler AM. In this way the cylinders are converted into a compressor in which substantial amounts of energy can be absorbed in the compression braking mode during, for example, downhill coasting of a large truck. The air compressed during the compression braking mode can be recovered, for example, by charging an air receiver for use in the pneumatic systems of those trucks and other vehicles that utilize pneumatic brakes, starter, and accessory systems.

In some applications, pilot-operated check valves may be preferred.

A practical, preferred embodiment on an engine, referred to by the reference character E, in accordance with the present invention is shown in FIG. 5 and differs from the engine 10 of FIG. 4 in that both the inlet valves and the divider valves of the various cylinders CYL are mechanically operated rather than pneumatically operated and that the engine is air cooled rather than liquid cooled.

As shown in FIG. 5, the engine includes a plurality of cylinders CYL1 ... n (only two of which are shown in cross-section in FIG. 5) with each cylinder defined by a first cylinder portion CYL1 and a second in-line cylinder portion CYL2 and with each divider valve and inlet valve located near the mid part of the combined cylinder as in the case of the FIG. 4 engine. The cylinder portions CYL1 and CYL2 are both located in respective left and right block sections EB1 and EB2 that are secured together by appropriate threaded fasteners along the medial line to constrain the divider and inlet valves between the two cylinder portions of each cylinder.

The cylinders CYL1 and CYL2 and the divider valve are maintained in their assembled form in a manner similar to that of FIG. 4. A compression spring resiliently urges the cylinder CYL2 toward the cylinder CYL1 to apply a sealing force for the various mating surfaces and to compensate for wear.

The back plate BP2 is secured by appropriate threaded fasteners and pilot pins to the end of the engine block while the back plate BP1 is adjustable to provide a variable compression feature. The back plate BP1 includes external threads, such as Acme or square threads, that engage internal complementary threads formed on the inside diameter surface the block EB1. A portion of the peripheral surface of the back plate BP1 includes an external gear sector which is designed to engage pinion gear PG3. A reversible gear motor drives the pinion gear PG3 to cause the back plate BP1 to rotate about the longitudinal axis and advance axially into or retract from the interior of engine block EB1 to vary the compression ratio. Respective axial faced cams C1 and C2, of construction similar to those discussed above relative to the FIG. 4 embodiment, are mounted on the back plates BP1 and BP2. As shown with respect to the cam C1, the cam includes a base that is received within an annular thrust bearing channel BC for relative rotation, an axially-extending portion that terminates with a curvilinear trackway and a radially outward-extending retaining lip similar to that described above in relationship to FIG. 4. The cams are each retained within their annular thrust bearing channel BC by a retaining plate as shown. The external periphery of each of the cams C1 and C2 includes a radially-extending ring gear which engage the pinion gears secured to the output shaft OS.

The cam follower mechanisms which secure each of the pistons P1 and P2 to their respective cams C1 and C2 are of construction similar to that disclosed above in relationship to the embodiment of FIG. 4. Each piston skirt includes a guideway that receives a guide block assembly GBA. A retainer screw passes through the guide block assembly and is secured in place by a locknut in a manner similar to that described above in FIG. 4.

The engine E includes a compressor section in a manner similar to that of the FIG. 4 embodiment including, in the left engine block EB1, a first stage compressor for providing initial pressure to the engine air cooling system. Air is provided through the inlet air filter. This initially pressurized inlet air is provided through peripheral apertures in a rotatably mounted shutter valve.

Cooling mist injectors CMI are provided on a bolt circle somewhat larger than the rotary shutter valve to selectively inject a coolant mist into the air stream of the cylinder cooling system. The mist flow rate is controlled so that the mist-laden cooling air, as it flows past the walls of the first cylinder CYL1 flashes to steam to thereby absorb heat of from the cylinder CYL1 walls and thereby effectively limit the temperature in the cylinder CYL1 to a desirably low limit. As the now steam-laden air passes the cylinder wall CYL2, additional heat energy is removed; however, the quantity of additional heat energy removed from the cylinder CYL2 is less than that absorbed from the cylinder CYL1 so that the cylinder CYL2 operates at a desirably higher temperature. The temperature of the cylinder CYL1 is kept desirably low and at or below a selected temperature to limit pre-ignition. The cylinder CYL2 temperature is maintained as high as reasonably practicable since the cylinder CYL2 contains the ignition air charge. The maintenance of a high temperature in the cylinder CYL2 increases the overall thermal efficiency of engine E. The first stage compressor, as described above, assists, along with a scavenging fan described below, in maintaining the desired steam flow in the cylinder jackets.

Useable energy is recovered from the steam flow in the engine cooling jackets by a cooling energy recovery system CER contained within a CER system housing located in the right-side engine block EB2, to the right of the valve control cam galley. The steam-laden air flow from the cooling jackets is directed into the CER system housing as shown in FIG. 5. The cooling energy recovery system CER includes, firstly, a scavenging fan mounted on the turbine main shaft TMS and, secondly, a steam turbine mounted adjacent to the scavenging fan. The scavenging fan serves to maintain the steam flow through the cooling jackets while the turbine extracts useable energy from the steam-laden air flow. If desired, the steam-laden air can be passed through a condenser to effect coolant recovery, for example, where a closed coolant cycle is desired.

In addition to the recovery of energy in the steam flow in the cooling jackets, useable energy is also recovered from the very high temperature and remaining pressure of the exhaust gas flow by the exhaust energy recovery system contained within an EER system housing located in the right-side engine block EB2 to the right of the cooling energy recovery system CER. The exhaust energy recovery system EER includes, firstly, a scavenging fan mounted on the turbine main shaft, secondly, a gas turbine mounted on the turbine main shaft TMS downstream of the scavenging fan, and, thirdly, a steam turbine mounted on the turbine main shaft TMS downstream of the gas turbine. The scavenging fan assists in scavenging exhaust gas from the various cylinders during their respective scavenging phases by inducing a partial vacuum in each cylinder and the exhaust gas passageways to assist the exhaust gas flow and also eliminate back pressure. The exhaust gas flow then drives the gas turbine in a conventional manner to extract useable mechanical energy from the exhaust gas flow. A water mist injector WMI is located between the gas turbine and the steam turbine and serves to introduce a water mist spray into the high temperature exhaust gases between the gas turbine and the steam turbine. The water mist removes heat energy from the exhaust gas by flashing to steam thereby creating a pressure increase. The steam-laden exhaust gas is then passed through the steam turbine which then extracts useable energy therefrom. The exhaust gas products, downstream of the steam turbine, are vented to the atmosphere through the exhaust pipe EXH. If desired, and depending upon the particular engine application, the moisture-laden exhaust gas can be passed through a condenser to effect water recovery. Condensation will also effectively remove particulate matter entrained in the exhaust gas and remove those gaseous exhaust products that dissolve within the condensate.

Valve operation is controlled by circular plate-type cams CIV and CDV located in a cam galley. The cams CIV and CDV are secured to a bearing supported sleeve BSS for rotation independently of the turbocharger main shaft TMS. The left end of the sleeve carries a gear that engages other gears (partially shown) of a gear train that is driven by a chain drive arrangement that is connected to the output shaft OS. The gear train drives the two cams CIV and CDV at a fixed rotational ratio and in timed relationship to the rotation of the cams C1 and C2.

Each of the cams CIV and CDV is generally circular and include a groove or channel (partially shown) cut into one face thereof with each groove defining a closed circuit, the radius of which varies from the axis of rotation to effect control of the inlet and divider valves. While the cam channels are not specifically shown, they include radial variations that cause opening and closing of the inlet valve and divider valve of each cylinder in timed relationship to one another and in timed relationship with the rotary position of the cams C1 and C2. An elongated cam follower is provided for each of the inlet valves and divider valves with each of the cam followers carried in a follower bushing and with one end of the cam follower carrying a pin or roller that fits within the channel of the appropriate valving cam. The opposite ends of each cam follower carry gear racks which engage, as shown in the detail of the upper valve of FIGS. 7A and the lower valve in FIG. 7B, complementary indentations 100 in the peripheral surfaces of the rotary inlet valve sleeve and the oscillating disk portion of the divider valve in a manner similar to that of the engine 10 of FIG. 4. Accordingly, each of the valving cams CIV and CDV is connected to cam followers in equal number to the number of cylinders in the engine E. In operation, as the bearing supported sleeve BSS carrying the control cams CIV and CDV rotates, the followers reciprocate in their respective bushings to control inlet valve and divider valve operation.

The valve cartridge structure of the FIG. 5 engine E embodiment is similar in function to those of the FIG. 4 engine embodiment although of somewhat different mechanical configuration as shown in FIGS. 7A and 7B. Each divider valve includes first and second spaced stationary disks VD1 and VD2, each having a plurality of sector-shaped ports 82 or openings equi-spaced about the cylinder axis. An oscillatable intermediate disk ID is mounted between the two stationary disks VD1 and VD2 and constrained therebetween. The oscillatable intermediate disk ID includes a number of ports 84 equal in size, number, and shape to those of the stationary valving disks VD1 and VD2. The stationary valving disks VD1 and VD2 each include rims or pads 86 about their through ports to bear and seal against the intermediate disk ID and prevent any leakage across the valve to prevent unintentional preignition of the fuel/air charge by the ignition temperature air in the adjacent cylinder. The inlet valve consists of a rotatable valve sleeve having a plurality of peripheral openings, intake ports IP that are designed to be in alternate registration with and out of registration with inlet ports formed through the cylinder wall of the CYL1. As shown in FIGS. 7A and 7B, the inlet valve sleeve and the intermediate disk ID carry indentations that engage the gear racks of the above-described valve cam followers.

The piston cam follower embodiments shown in FIGS. 4 and 5 are representative of various follower arrangements. Other piston cam follower structural organizations suitable for use in the engine embodiments described include those shown in FIGS. 8A–8E.

Figure 8C:
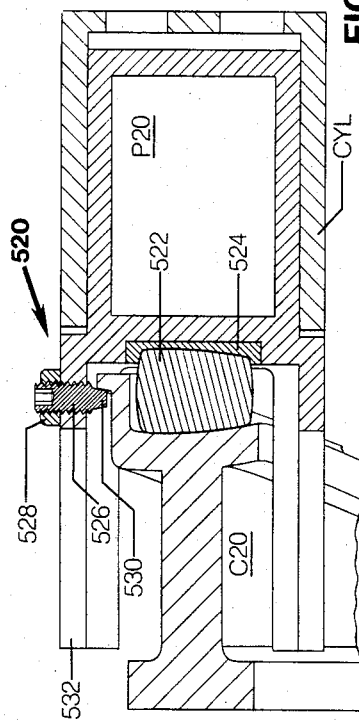
FIG. 8C is a cross-sectional view of a second alternative cam follower embodiment.
Figure 8D:
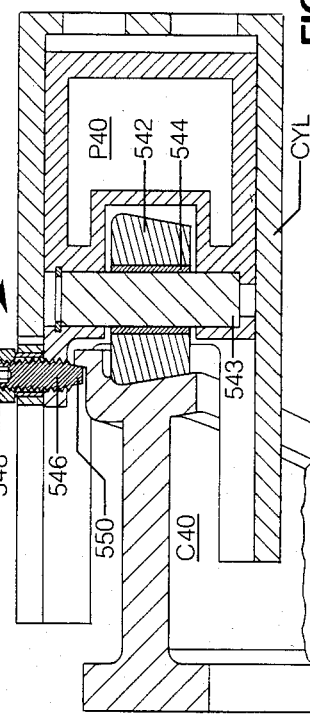
FIG. 8D is a partial cross-sectional view of a third alternate cam follower embodiment.
Figure 8E:
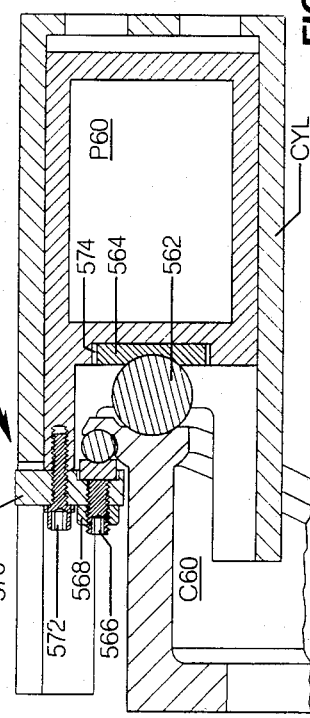
FIG. 8E is a cross-sectional view of a fourth alternate cam follower embodiment in accordance with the present invention.
Figure 8A:
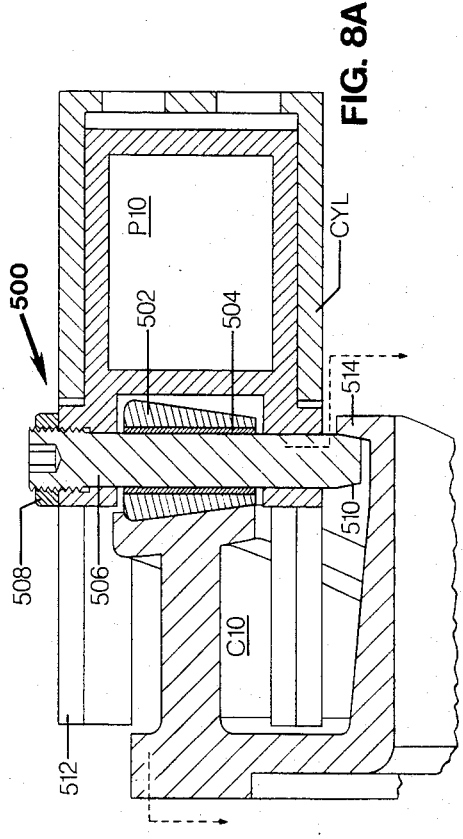
FIG. 8A is a cross-sectional view of a first alternate cam follower embodiment.

The cam follower 500 shown in cross-section in FIG. 8A utilizes a tapered rolling element 502 that includes a sleeve bearing 504 journaled for relative rotation about a connecting pin 506. The connecting pin 506 is threaded at its upper end and is in threaded engagement with an internally threaded counterbore formed in the skirt portion of the piston P10 as shown. A locknut 508 maintains the adjusted position of the connecting pin 506 once the desired assembly and adjustment is completed. The remote end 510 of the connecting pin 506 is tapered as shown. The cam C10 shown in FIG. 8A is a structural variation of the cams shown in FIGS. 4 and 5 and includes a trackway that is generally linear so as to engage the linear tapered surface of the rolling element 502 with the retainer lip 514 offset from the trackway to engage the tapered end 510 of the connecting pin 506. Rotation of the connecting pin 506 adjusts the clearance dimension between the remote tapered end 510 of the connecting pin 506 and the underside of the retainer lip 514. During rotation of the cam C10, the piston P10 reciprocates in its cylinder as described above in relationship to FIGS. 4 and 5 with the movement controlled, in part, by the guide slot 512 (only one side of which is shown in FIG. 8A).

Figure 8B:
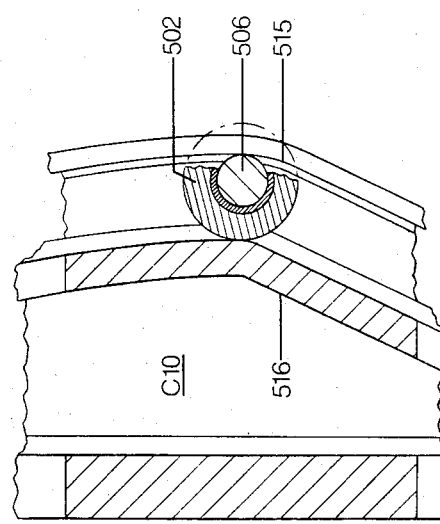
FIG. 8B is a partial cross-sectional view taken along line 8B—8B of FIG. 8A illustrating the respective rolling contact points for the cam follower rolling member and pin follower arrangement.

The geometry of the FIG. 8A embodiment is beneficially designed to minimize jump during profile changeover. As shown in FIG. 8B, the organization of the FIG. 8A cam follower 500 places the small diameter remote end 510 of the connecting pin 506 axially beyond the rolling element 502 so that the tapered end 510 of the connecting pin 506 runs against a more gentle changeover curve 515 than would be the case, for example, than the surface 516.

The cam follower 520 shown in FIG. 8C utilizes a non-journaled semi-spheroidal roller 522 that engages a curvilinear surface of the cam C20 trackway and a bearing pad 524 retained within the base of the piston P20. A threaded retainer screw 526 passes through a threaded bore in the skirt of the piston P20 and is retained in place by a threaded locking nut 528. The remote end of the retainer screw 530 engages the underside of the retainer lip of the cam C20. The motion of the piston P20 is controlled, in part, by the guide slot 532, only one side of which is shown in FIG. 8C.

The cam follower 540 of FIG. 8D combines the structural attributes of the cam followers of FIGS. 8A and 8C as discussed above. A tapered rolling element 542 is journaled by a bearing sleeve 544 about a piston pin 543 retained in a counterbore in the piston P40 by an internal C-clip. A retainer screw 546 extends through a clearance bore in a guide block through a threaded bore in the piston skirt. A locknut 548 maintains the retainer screw 546 in its adjusted position. The remote end of the retainer screw 546 is tapered as shown at 550 and engages the underside of the retainer lip of cam C40. The reciprocating motion of the piston P40 is controlled, as in the case of the embodiments described above, by the motion of the guide block in the guide slot.

The cam follower 560 of the FIG. 8E embodiment includes a spheroidal ball 562 which is located between and engages spherically-shaped mating surfaces on the trackway of the cam C60 and a bearing pad 564 located in the base of the piston P60. The bearing pad 564 is mounted in a pad receiving cavity with clearance 574 top and bottom to allow self-alignment. The retainer assembly is defined by a spheroidal rolling element which engages a spheroidal complementary surface on the underside of the cam C60 and is maintained in place by an adjustment locknut 568 and screw 566 which bears against a retaining ball pad portion of a guide block 570 which rides in the guide slot. A mounting screw 572 mounts the assembly to the skirt of the piston P60.

As can be appreciated by those skilled in the art, the operating cycle(s) illustrated in FIGS. 1–3 and their above-described variations are not limited to the engine configurations described in FIGS. 4 and 5 but are well suited to crankshaft/connecting rod type engines. Engines with two crankshafts also can be adapted readily to the cycles of FIGS. 1–3 by connecting the crankshafts with 1:1 or 1:2 drive ratios. For example, a twin crankshaft, opposed piston, two-cycle engine can implement the operating cycle of FIG. 1 (2/2 stroke) by connecting the crankshafts with a 1:1 ratio drive and also adapted to the operating cycles of the FIG. 2 (4/2 stroke) cycle and of the FIG. 3 (4 V/2 stroke) cycle by connecting the crankshafts with a 1:2 ratio drive. In addition to this twin crankshaft opposed piston configuration, the H-block opposed cylinder arrangement can be operated to implement the various cycles of FIGS. 1–3 with the crankshafts connected with a 1:1 or a 1:2 drive ratio and with the combustion chambers forming a "U" or similar shape.

Single crankshaft engine configurations that can be adapted to the cycle of FIG. 1 include the parallel cylinder, double-row radial, opposed cylinder, V-block, and in-line configurations, among others. Modification of the crankshaft in these configurations is required to allow piston pairs to function as the air/fuel and ignition air working pistons with the pistons attaining their top dead center positions substantially simultaneously with the two cylinders and the combustion chambers forming a "U" or similar shape and with a divider valve between the two cylinders to define the air/fuel chamber and the ignition air chamber.

The cycles of FIGS. 2 and 3 can be adapted to a split in-line crankshaft arrangement by separating the crankshaft between adjacent cylinders and reconnecting the crankshafts with a 1:2 ratio drive.

In addition, the operating cycle can be adapted to a rotary (Wankel) engine configuration in which twin rotors function as the equivalent of the working pistons and the divider valve. In such an arrangement, twin rotors are mounted on a common shaft with each rotor mounted in their respective chamber with a passageway communicating between the twin chambers. The rotors are effective to compress respective air/fuel and ignition air charges to the necessary pressures with the rotors uncovering the passageway to admit the ignition temperature air into the air/fuel mixture to effect combustion with the subsequently expanding combustion products operating against both rotors. By providing a controllable divider valve in the passageway and by varying the effective chamber sizes in a manner similar to that described above, it is possible to achieve results similar to those of the piston/cylinder engines.

After considerable research as to the attributes of various engine configurations, the axial-piston configuration was selected as the preferred embodiment for its recognized advantages.

As will be apparent to those skilled in the art, various modifications and variations of the described preferred embodiment can be made without departing from the spirit and scope of the invention as presented in the appended claims and their legal equivalent.

What is claimed is:

1. A method for extracting work from a fuel comprising the steps of:
   forming a homogeneous mixture of a combustion supporting gas and a fuel;
   compressing the homogeneous mixture of a combustion supporting gas and a fuel to a predetermined pressure less than that which would effect ignition;
   compressing a quantity of combustion supporting gas to a predetermined pressure sufficient to cause the temperature of the so-compressed compression supporting gas to increase to a temperature greater than that of the ignition temperature of said so-compressed homogeneous mixture of a combustion supporting gas and a fuel;
   introducing the so-compressed combustion supporting gas into the so-compressed mixture of a combustion supporting gas and fuel to cause ignition thereof and the formation of combustion products;
   introducing the combustion products of the so-ignited mixture of the combustion supporting gas and fuel into the compressed combustion supporting gas to cause the addition of heat thereto; and extracting work from the combustion products of said so-ignited mixture and the additionally heated combustion supporting gas.

2. The method of claim 1, wherein said fuel is in a vapor form when mixed with said combustion supporting gas.

3. The method of claim 1, wherein said fuel is in a gaseous form when mixed with said combustion supporting gas.

4. The method of claim 1, wherein said fuel is in a particulate form when mixed with said combustion supporting gas.

5. The method of claim 1, wherein said first-mentioned and second-mentioned compressing steps occur substantially simultaneously.

6. The method of claim 1, wherein said forming step further comprises:
introducing the fuel into the combustion supporting gas contained within a variable volume space defined between a compression chamber and a movable working element.

7. The method of claim 6, wherein said step of compressing the homogeneous mixture further comprises moving a working element to effect compression.

8. The method of claim 1, wherein said forming step further comprises introducing the combustion supporting gas and the fuel into a first variable volume space defined by a first compression chamber and first movable working element.

9. The method of claim 8, wherein said second-mentioned compressing step further comprises introducing the combustion supporting gas into a second variable volume space defined by a second compression chamber and second movable working element.

10. The method of claim 9, wherein said first-mentioned introducing step further comprises the step of opening a valving element to establish communication between said first- and second-mentioned compression chambers.

11. A method of extracting mechanical work from a fuel comprising the steps of:
providing a homogenous mixture of a fuel and a combustion supporting gas in a first variable volume compression chamber defined between a first cylinder and first movable piston;
providing a combustion supporting gas in a second variable volume compression chamber defined between a second cylinder and a second movable piston;
causing said first piston to reduce the volume of the first compression chamber to compress the homogeneous mixture to a predetermined pressure, any temperature rise consequent to compression causing a temperature rise less than that which causes ignition thereof;
causing the second piston to reduce the volume of the second compression chamber to compress the combustion supporting gas therein to cause a temperature increase thereof to a temperature greater than the ignition temperature of the homogeneous mixture in the first chamber; and
introducing the compressed combustion supporting gas into the homogeneous mixture to cause ignition thereof with resulting combustion products entering both the first and second variable volume chambers to move the first and second pistons to effect a volumetric expansion.

12. The method of claim 11, further comprising the step, subsequent to said introducing step, of positionally maintaining, for a selected period of time, the position of the first and second pistons to effect constant volume combustion.

13. The method of claim 11, further comprising the step, subsequent to said introducing step, of positionally controlling, for a selected period of time, the position of the first and second working elements to effect constant pressure combustion.

14. The method of claim 11, further comprising the step of:
exhausting the combustion products from the first and second variable volume compression chambers.

15. The method of claim 14, further comprising, after said exhausting step of introducing combustion supporting gas without fuel into said first and second variable volume compression chambers to remove combustion products therefrom.

16. The method of claim 14, further comprising the step of interrupting the introduction path between the first and second variable volume compression chambers.

17. The method of claim 14, further comprising the step of introducing the exhausted combustion products to a turbine.

18. The method of claim 17, further comprising the step introducing a vaporizable fluid into the exhausted combustion products prior introduction into the turbine.

19. The method of claim 17, further comprising the step of precompressing the introduced combustion support gas in a rotary compressor coupled to the turbine.

20. The method of claim 19, further comprising the step of introducing a combustion enhancing fluid into the combustion supporting gas.

* * * * *